(12) United States Patent
Lubnin et al.

(10) Patent No.: US 8,383,713 B2
(45) Date of Patent: Feb. 26, 2013

(54) HYDROLYTICALLY STABLE POLYURETHANE NANOCOMPOSITES

(75) Inventors: Alexander V. Lubnin, Copley, OH (US); Elizabeth A. Flores, Sheffield Lake, OH (US); Gregory R. Brown, Heywood (GB); Nai Z. Huang, Cleveland, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 12/859,974

(22) Filed: Aug. 20, 2010

(65) Prior Publication Data

US 2011/0046286 A1  Feb. 24, 2011

Related U.S. Application Data

(60) Provisional application No. 61/235,806, filed on Aug. 21, 2009.

(51) Int. Cl.
*C08K 3/26* (2006.01)
(52) U.S. Cl. ....................................................... 524/425
(58) Field of Classification Search .................. 524/425
See application file for complete search history.

(56) References Cited

U.S. PATENT DOCUMENTS

| | | | |
|---|---|---|---|
| 5,133,742 A | 7/1992 | Pinchuk | |
| 6,576,702 B2 | 6/2003 | Anderle et al. | |
| 7,598,315 B2 | 10/2009 | Lubnin | |
| 2004/0038026 A1* | 2/2004 | Li et al. | 428/354 |
| 2008/0131707 A1* | 6/2008 | Feeney et al. | 428/451 |
| 2008/0153975 A1 | 6/2008 | Lubnin | |
| 2008/0227901 A1 | 9/2008 | Lefevre et al. | |
| 2008/0241600 A1* | 10/2008 | Tanaka et al. | 428/832 |

FOREIGN PATENT DOCUMENTS

| | | |
|---|---|---|
| CN | 101230232 A | 7/2008 |
| WO | 2004/048484 A1 | 6/2004 |
| WO | 2006/079098 A1 | 7/2006 |

OTHER PUBLICATIONS

Chemical Abstracts, Jun. 26, 1989, No. 13, XP000180263, ISSN: 0009-2258, Columbus, Ohio, Water-Resistant Polyester-Polyurethane Compositions, Nishiyama, Hidemi et al.
Macromol, Symp. 2011, 301, pp. 63-72; Comparative Properties of Thermoplastic Polyurethane Adhesive Filled with Natural or Precipitated Calcium; Jessica Donta-Robles, et. al. (Published after Aug. 20, 2010).

* cited by examiner

*Primary Examiner* — Peter Szekely
(74) *Attorney, Agent, or Firm* — Samuel B. Laferty

(57) ABSTRACT

The water-resistance properties of polyester-based polyurethanes are remarkably enhanced, without adversely affecting the transparency properties of these materials to any significant degree, by including in the polymer a substantially dispersed nano-particle proton scavenger.

The hydrolytic stability and water-resistance properties of polyester-based polyurethanes are remarkably enhanced and match those of polycarbonate-based polyurethanes, without adversely affecting the transparency of these materials to any significant degree, by including in the polymer a substantially dispersed nano-particle proton scavenger such as calcium carbonate.

22 Claims, 2 Drawing Sheets

TEM photos of polyester-polyurethane nano-CaCO₃ composite.

TEM photos of Omya XC-6600-34 $CaCO_3$.

TEM photo of 5 %wt. nano-$CaCO_3$ (from Example 10) composite with Sancure 825.

HYDROLYTICALLY STABLE POLYURETHANE NANOCOMPOSITES

CROSS REFERENCE

This application claims the benefit of U.S. Provisional Application Ser. No. 61/235,806 filed on Aug. 21, 2009.

BACKGROUND AND SUMMARY

Polymers containing ester groups such as, for example, polyesters, polyester-based polyurethanes, polyester-based polyureas and polyester-based polyamides have less than desirable water-resistance properties due to hydrolysis of the ester group.

In accordance with this invention, it has been found that the water-resistance properties of polyester-based polyurethanes can be remarkably enhanced, without adversely affecting the transparency properties of these materials to any significant degree, by including in the polymer a substantially dispersed nano-particle proton scavenger.

Thus, this invention provides a hydrolytically stable polyurethane nanocomposite comprising a solid polyester-polyurethane polymer containing proton scavenger nanoparticles in a substantially dispersed form.

In addition, this invention further provides a colloidally stable aqueous dispersion comprising water, a polyester-polyurethane polymer and substantially dispersed proton scavenger nanoparticles.

In addition, this invention further provides processes for making such an aqueous dispersion in which these proton scavenger nanoparticles already in a substantially dispersed form are combined with at least one of (a) the prepolymer used to form this polyester-polyurethane polymer before this prepolymer is combined with water for forming an aqueous dispersion, (b) this prepolymer after or during the period it is combined with water forming an aqueous prepolymer dispersion, (c) one or more ingredients forming this prepolymer, (d) an aqueous dispersion of the polyester-polyurethane polymer formed by chain extending this prepolymer, and (e) combinations thereof.

In addition, this invention also provides other processes for making such a dispersion in which a preliminary material comprising the proton scavenger in the form of particles and/or agglomerates having a larger particle size than the substantially dispersed nanoparticles is comminuted in the presence of at least one of (a) the prepolymer used to form this polyester-polyurethane polymer before this prepolymer is combined with water for forming an aqueous dispersion, (b) this prepolymer after or during the period it is combined with water forming an aqueous prepolymer dispersion, (c) one or more ingredients forming this prepolymer, and (d) combinations thereof.

BRIEF DESCRIPTION OF THE DRAWINGS

This invention may be more readily understood by reference to the following drawings wherein.

SUMMARY OF INVENTION

Figure 1:
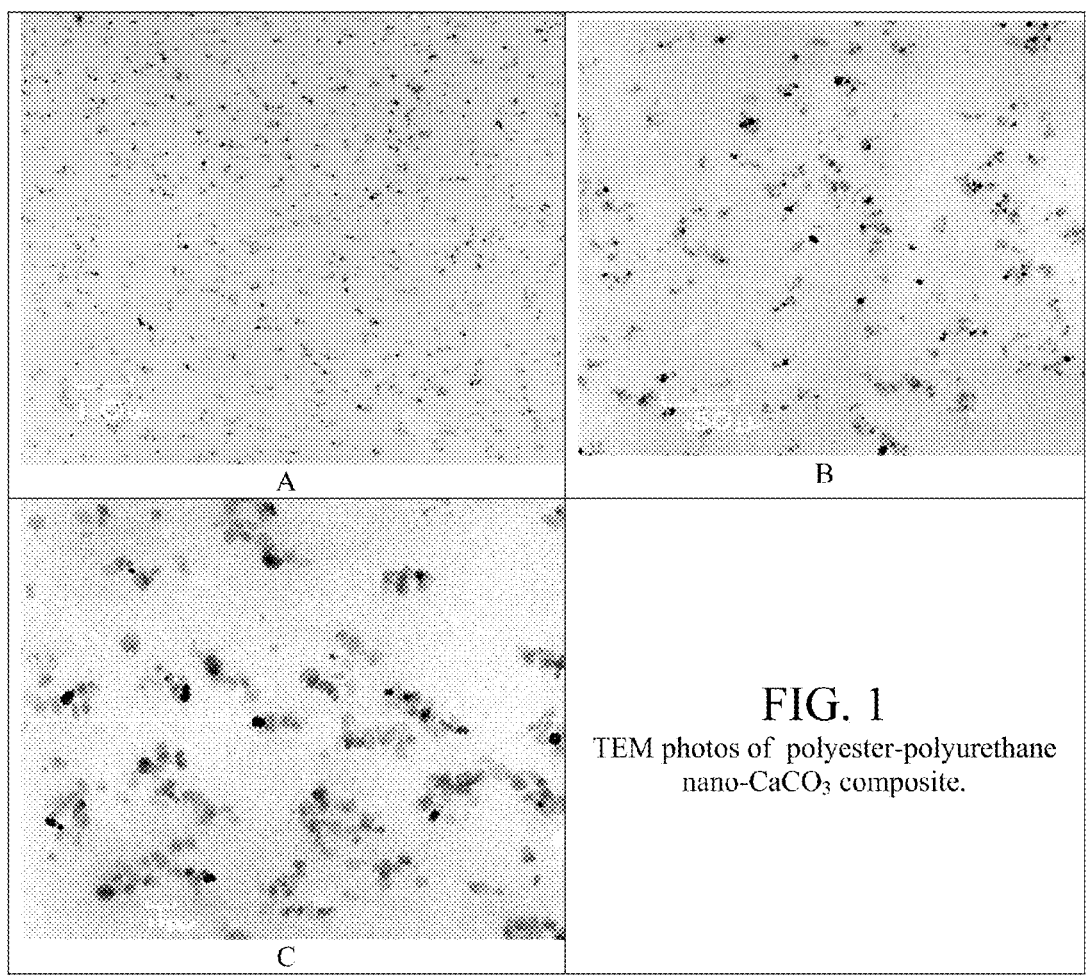
FIGS. 1A, 1B and 1C are photomicrographs of the polyester polyurethane film produced in the following Example 2.

A polyurethane composition is described which has improved hydrolytic stability over prior art polyurethane compositions. Polyurethanes based on polyester macroglycols are known to be susceptible to hydrolysis. The hydrolytic stability of the improved product is attributed to the presence of a proton scavenger in highly dispersed form having significant surface area (increasing the probability that the proton scavenger will be able to scavenge protonic species before the cause hydrolytic chain scission in the polyester portion of the polyurethane). The polyurethane can be in the form of a film, coating or shaped article. The proton scavenger is preferably an inorganic carbonate salt such as calcium carbonate. If the aggregates of the proton scavenger are small relative to the wavelength of light the polyurethane composition will be substantially transparent to visible light. If the proton scavenger, e.g. calcium carbonate, is comprised of loosely aggregated primary crystallites, that are in the 5-100 nanometer weight average diameter, it will have high surface area (e.g. >40 $m^2/g$) will be effective at scavenging protons.

DETAILED DESCRIPTION

Definitions

In this document, "proton scavenger" and "acid scavenger" will be understood to be synonymous with one another.

In addition, "aqueous" and "water" will be understood to be synonymous with one another.

In addition, "polyurethane" is a generic term used to describe polymers including oligomers (e.g., prepolymers) which contain the urethane group, i.e., —O—C(=O)—NH—, regardless of how they are made. As well known, these polyurethanes can contain additional groups such as urea, allophanate, biuret, carbodiimide, oxazolidinyl, isocyanurate, uretdione, alcohol, amine, hydrazide, siloxane, silane, ketone, olefin, etc., in addition to urethane groups.

"Wt. %" means the number of parts by weight of monomer per 100 parts by weight of polymer, or the number of parts by weight of ingredient per 100 parts by weight of composition or material of which the ingredient forms a part.

"Aqueous medium" means a composition containing a substantial amount of water. It may contain other ingredients as well.

The "final polyurethane product" refers to the form of the polyurethane in the aqueous dispersion product of this invention. Where the polyurethane prepolymer is optionally chain extended, the final polyurethane product is this chain extended polymer. Where the polyurethane prepolymer is not chain extended, the final polyurethane product is the prepolymer itself.

"Substantial absence of water" refers to compositions formed without the intentional addition of any significant amount water, e.g., about 2 wt. % or less or so. A composition made by draining the water from an aqueous dispersion of silica and then adding the silica to organic ingredients would be formed in the substantial absence of water, even though a small amount of water might be present as a contaminant from the silica. A composition made by adding a highly concentrated silica dispersion to organic ingredient would not be formed in the substantial absence of water. Also, "substantial absence of water" does not refer to water of crystallization.

"Substantial absence of surfactant" as well as "substantially free of residual surfactant" in reference to a dispersion means that the dispersion is made without intentionally including a surfactant for suspending or dispersing the dispersed phase of the dispersion.

Thermoplastic Polyester Polyurethane

This invention includes the use of substantially dispersed nanoparticles (referring to the primary crystallites or particles of the proton scavenger and or the aggregates of the proton scavenger) of proton scavenger nanoparticles to enhance the water-resistant (hydrolytic stability) of thermoplastic polyurethanes containing polyester segments within the polyurethane polymer or prepolymer. Thermoplastic polyurethanes are made with the same components as waterborne polyester polyurethanes (polyurethane dispersions in water) immediately below but typically the thermoplastic polyurethanes have substantially less or no water-dispersibility enhancing compound(s). In one embodiment the hydrolytically stable polyurethane is a thermoplastic polyurethane. The technology for making and using thermoplastic polyurethanes are well known and described for example in U.S. Pat. No. 6,777,466 B2 and J. K. Backus et al., "Polyurethanes," in: Encyclopedia of Polymer Science and Engineering. Vol. 13, H F. Mark et al., Ed, pp. 243-303 (1988), the entire disclosure of which is incorporated herein by reference.

Waterborne Polyester Polyurethanes

This invention in one embodiment relates to polyester polyurethanes which are derived from aqueous dispersions and which, when dried and cured, produce solid polyester segment containing polyurethane products which are tough and, depending on the other ingredients present (e.g., absence of $TiO_2$ or other pigment), can be a transparent.

Polyurethanes are normally made by reacting together three principle ingredients, a macroglycol or analog, a diisocyanate and an optional chain extender such as short-chain di- and polyols, di- and polyamines or the like. Polyurethanes in which the macroglycol is a polyether, a hydrocarbon, or a polycarbonate exhibit superior resistance against degradation by hydrolysis than when the macroglycol is a polyester. In contrast, polyester polyurethanes are less resistant. See, U.S. Pat. No. 5,133,742 to Leonard Pinchuk, the entire disclosure of which is incorporated herein by reference. In many applications, hydrolytic instability of the polyester segment is a fatal flaw. Examples include textiles which must withstand multiple laundry cycles and/or humid environment, outdoor coatings exposed to rain, marine coatings, and the like.

Some polyurethanes are available in the form of aqueous dispersions. If so, it is customary to include in the backbone of the polymer at least one "water-dispersability enhancing compound" (i.e., a comonomer) which helps disperse the polymer in the aqueous medium by reducing interfacial tension and stabilizing the dispersed phase against aggregation. Dimethylolpropanoic acid is normally used for this purpose, although other analogous compounds can be used.

Such waterborne polyurethanes are well known and described, for example, in U.S. Pat. No. 6,576,702, the entire disclosure of which is incorporated herein by reference. They may be prepared by reacting (1) at least one polyisocyanate; (2) at least one macroglycol or analog; and (3) at least one water-dispersability enhancing compound to form an isocyanate terminated prepolymer, which can then be optionally neutralized by reaction with (4) at least one neutralizing agent, and then dispersed in (5) water to form an aqueous prepolymer dispersion. Such dispersions can be used, as is, to form tough, transparent coatings and other products. Alternatively, such dispersions can be treated to chain extend the prepolymer to form more complex polyurethanes, for example, by reaction with (6) water or (7) an amine having two or more primary and/or secondary amine groups. The poly(urethane-urea)s so formed can then be used to form tough, transparent coatings and other products.

This invention is applicable to any such waterborne polyurethane in which a not-insignificant portion of the macroglycol (or analog) component is composed of a compound that includes at least one ester linkage. For convenience, such compounds are referred to hereinafter as "ester-containing multi-functional isocyanate-reactive compounds". As indicated above, solid products made from such ester-containing polyurethane polymers and prepolymers are generally more prone to degradation by hydrolysis than their polyether and polycarbonate counterparts. In accordance with this invention, this degradation problem is overcome by incorporating in the polymer a substantially dispersed nano-particle proton scavenger.

Essentially any ingredient that has previously been used, or which may be used in the future, to make waterborne polyester polyurethanes can be used to make the waterborne polyester polyurethane polymers and prepolymers of this invention. Examples include the following:

(i) Polyisocyanate

Suitable polyisocyanates have an average of about two or more isocyanate groups, preferably an average of about two to about four isocyanate groups per molecule and include aliphatic, cycloaliphatic, araliphatic, aromatic, and heterocyclic polyisocyanates, as well as products of their oligomerization, used alone or in mixtures of two or more. Diisocyanates are more preferred.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylenediisocyanate, and 2,4,4-trimethyl-hexamethylene diisocyanate.

Specific examples of suitable cycloaliphatic polyisocyanates include dicyclohexylmethane diisocyanate, (commercially available as Desmodur™ W from Bayer Corporation), isophorone diisocyanate, 1,4-cyclohexane diisocyanate, 1,3-bis-(isocyanatomethyl)cyclohexane, and the like. Preferred cycloaliphatic polyisocyanates include dicyclohexylmethane diisocyanate and isophorone diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Examples of suitable aromatic polyisocyanates include 4,4'-diphenylmethylene diisocyanate, toluene diisocyanate, their isomers, naphthalene diisocyanate, and the like. Preferred aromatic polyisocyanates include 4,4'-diphenylmethylene diisocyanate and toluene diisocyanate.

Examples of suitable heterocyclic isocyanates include 5,5'-methylenebisfurfuryl isocyanate and 5,5'-isopropylidenebisfurfuryl isocyanate.

(ii) Ester-Containing Multi-Functional Isocyanate-Reactive Compound

Any compound that includes (1) at least two functional groups, each of which is capable of reacting with an isocyanate group to form a urethane linkage, as well as (2) an ester linkage between at least two of these functional groups (the "ester-containing multi-functional isocyanate-reactive compound") can be used to make the inventive waterborne polyester polyurethanes of this invention. In this context, "between" means that the ester and multi-functional isocyanate-reactive moieties are arranged in the compound in such a way that cleavage of the ester linkage would cause the compound to separate into at least two different segments each carrying an isocyanate-reactive moiety (or a urethane linkage formed from such moiety).

The most common ester-containing multi-functional isocyanate-reactive compound used in this invention will be the polyester polyols including alkyds and esters of phosphonic acid. Esterification products prepared by the reaction of organic polycarboxylic acids or their anhydrides with a stoichiometric excess of a diol or diols are especially interesting. Examples of suitable polyols for use in this reaction include poly(glycol adipate)s, poly(ethylene terephthalate) polyols, polycaprolactone polyols, alkyd polyols, orthophthalic polyols, sulfonated and phosphonated polyols, and the like, and mixtures thereof.

In addition to phosphonate (O=P(OR)2R) groups, the polyols may contain the following groups: Phosphinite (P(OR)R2), phosphonite (P(OR)2R), phosphite (P(OR)3), phosphinate (O=P(OR)R2), phosphate —O=P(OR)3 groups.

Examples of suitable phosphorus-containing polyols include Fyroltex HP, Fyrol 6 and Fyrol PNX from ICL Industrial Products and similar polyols.

The diols used in making these polyester polyols include alkylene glycols, e.g., ethylene glycol, 1,2- and 1,3-propylene glycols, 1,2-, 1,3-, 1,4-, and 2,3-butylene glycols, hexane diols, neopentyl glycol, 1,6-hexanediol, 1,8-octanediol, and other glycols such as bisphenol-A, cyclohexane diol, cyclohexane dimethanol (1,4-bis-hydroxymethylcycohexane), 2-methyl-1,3-propanediol, 2,2,4-trimethyl-1,3-pentanediol, diethylene glycol, triethylene glycol, tetraethylene glycol, polyethylene glycol, dipropylene glycol, polypropylene glycol, dibutylene glycol, polybutylene glycol, dimerate diol, hydroxylated bisphenols, polyether glycols, halogenated diols, and the like, and mixtures thereof. Preferred diols include ethylene glycol, diethylene glycol, butylene glycol, hexane diol, and neopentyl glycol.

Suitable carboxylic acids used in making these polyester polyols include dicarboxylic acids and tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids such as oleic acid, and the like, and mixtures thereof. Preferred polycarboxylic acids used in making the polyester polyols include aliphatic or aromatic dibasic acids.

Particularly interesting polyols are the polyester diols, i.e., any compound containing the —C(=O)—O— group. Examples include poly(butanediol adipate), caprolactones, acid-containing polyols, polyesters made from hexane diol, adipic acid and isophthalic acid such as hexane adipate isophthalate polyester, hexane diol neopentyl glycol adipic acid polyester diols, e.g., Piothane 67-3000 HNA (Panolam Industries) and Piothane 67-1000 HNA; as well as propylene glycol maleic anhydride adipic acid polyester diols, e.g., Piothane 50-1000 PMA; and hexane diol neopentyl glycol fumaric acid polyester diols, e.g., Piothane 67-500 HNF. Other preferred polyester diols include Rucoflex™ S1015-35, S1040-35, and S-1040-110 (Bayer Corporation).

In addition to polyester polyols, other polyols which contain at least one ester linkage between isocyanate-reactive hydroxyl groups can also be used as the ester-containing multi-functional isocyanate-reactive compound of this invention. Examples include the following types of ester-containing polyols: polyether polyols, polycarbonate polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols and hydrogenated polybutadiene polyols, polyisobutylene polyols, polyacrylate polyols, halogenated polyesters and polyethers, and the like, and mixtures thereof. The polyether polyols, polycarbonate polyols, polysiloxane polyols, and ethoxylated polysiloxane polyols are preferred.

Ester containing polyether polyols can also be used as the ester-containing multi-functional isocyanate-reactive compound of this invention. In addition to an ester linkage, such compounds also contain the —C—O—C— group. They can be obtained in a known manner by the reaction of (A) the starting compounds that contain reactive hydrogen atoms, such as water or the diols set forth for preparing the polyester polyols, and (B) alkylene oxides, such as ethylene oxide, propylene oxide, butylene oxide, styrene oxide, tetrahydrofuran, epichlorohydrin, and the like, and mixtures thereof. Preferred polyethers include poly(propylene glycol), polytetrahydrofuran, and copolymers of poly(ethylene glycol) and poly(propylene glycol).

Ester containing polycarbonate polyols can also be used as the ester-containing multi-functional isocyanate-reactive compound of this invention. In addition to an ester linkage, such compounds also include the —O—C(=O)—O— group. They can be obtained, for example, from the reaction of (A) diols such 1,3-propanediol, 1,4-butanediol, 1,6-hexanediol, diethylene glycol, triethylene glycol, tetraethylene glycol, and the like, and mixtures thereof with (B) diarylcarbonates such as diphenylcarbonate or phosgene. Aliphatic and cycloaliphatic polycarbonate polyols can also be used.

Useful ester-containing polyhydroxy polyacetals for use as the ester-containing multi-functional isocyanate-reactive compound of this invention include compounds that can be prepared from the reaction of (A) aldehydes, such as formaldehyde and the like, and (B) glycols such as diethylene glycol, triethylene glycol, ethoxylated 4,4'-dihydroxy-diphenyldimethylmethane, 1,6-hexanediol, and the like. Polyacetals can also be prepared by the polymerization of cyclic acetals.

In addition to the above ester-containing polyols, ester-containing compounds terminated with other isocyanate-reactive functional groups can be used to formulate the waterborne polyester polyurethanes of this invention. Examples include ester-containing polythiols, polyamines, polyester amides and polyamides, such as the predominantly linear condensates obtained from reaction of (A) polybasic saturated and unsaturated carboxylic acids or their anhydrides, and (B) polyvalent saturated or unsaturated aminoalcohols, diamines, polyamines, and the like, and mixtures thereof.

Diamines and polyamines are among the preferred compounds useful in preparing the aforesaid polyester amides and polyamides. Suitable diamines and polyamines include 1,2-diaminoethane, 1,6-diaminohexane, 2-methyl-1,5-pentanediamine, 2,2,4-trimethyl-1,6-hexanediamine, 1,12-diaminododecane, 2-aminoethanol, 2-[(2-aminoethyl)amino]-ethanol, piperazine, 2,5-dimethylpiperazine, 1-amino-3-aminomethyl-3,5,5-trimethyl-cyclohexane (isophorone diamine or IPDA), bis-(4-aminocyclohexyl)-methane, bis-(4-amino-3-methyl-cyclohexyl)-methane, 1,4-diaminocyclohexane, 1,2-propylenediamine, hydrazine, urea, amino acid hydrazides, hydrazides of semicarbazidocarboxylic acids, bis-hydrazides and bis-semicarbazides, diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)-piperazin-e, N,N,N'-tris-(2-aminoethyl) ethylene diamine, N-[N-(2-aminoethyl)-2-amino-ethyl]-N'-(2-aminoethyl)-piperazine, N-(2-aminoethyl)-N'-(2-piperazinoethy-1)-ethylene diamine, N,N-bis-(2-aminoethyl)-N-(2-piperazinoethyl)amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-tri-aminopyrimidine, polyoxypropylene amines, tetrapropylenepentamine, tripropylenetetramine, N,N-bis-(6-aminohexyl)amine, N,N'-bis-(3-aminopropyl)ethylene diamine, and 2,4-bis-(4'-aminobenzyl)-aniline, and the like, and mixtures thereof. Preferred diamines and polyamines include 1-amino-3-aminomethyl-3,5,5-tri-methyl-cyclohexane (isophorone diamine or IPDA), bis-(4-aminocyclohexyl)-m-ethane, bis-(4-amino-3-methylcyclohexyl)-methane, ethylene diamine, diethylene triamine, triethylene tetramine, tetraethylene pentamine, and pentaethylene hexamine, and the like, and mixtures thereof. Other suitable diamines and polyamines include Jeffamine™ D-2000 and D-4000, which are amine-terminated polypropylene glycols, differing only by molecular weight, and which are available from Huntsman Chemical Company.

The ester-containing multi-functional isocyanate-reactive compound (e.g., ester containing macroglycol) used to make the waterborne ester-containing polyurethane of this invention will normally be polymeric and hence will have a molecular weight of at least about 500 Daltons, more typically about 1,000-10,000 Daltons, or even 1,000-6,000 Daltons. While the term macroglycol is used, it is understood that these macroglycols can have two or more hydroxyl groups (or other isocyanate reactive groups) per molecule (i.e., the macroglycol is not limited to only two isocyanate reactive groups). Low molecular weight versions of these compounds can also be used, i.e., compounds having a number average molecular weight less than about 500 Dalton such as aliphatic, cycloaliphatic and aromatic ester-containing polyols, especially diols although most authors label the lower molecular weight glycol species (e.g., less than 500 Daltons molecular weight) as chain extenders.

(iii) Ester-Free Multi-Functional Isocyanate-Reactive Compound

The waterborne polyester polyurethanes of this invention can also include additional multi-functional isocyanate-reactive compounds which do not contain any ester linkages as optional ingredients. Generally speaking, the same ester-containing multi-functional isocyanate-reactive compounds described above can be used for this purpose, except that such compounds will be free or essentially free of ester linkages.

Included in this group of comonomers are the low molecular weight compounds typically referred to as "chain extenders". Examples include low molecular weight polyols with number-average molecular weight less than about 500 Daltons and diols, diamines and polyamines described above. "Polyol" in this context means any product having an average of about two or more hydroxyl groups per molecule. Specific examples include aliphatic, cycloaliphatic and aromatic polyols, especially diols, having 2-20 carbon atoms, more typically 2-10 carbon atoms, such as 1,4-butanediol. Any other compounds known to function as chain extenders in polyester polyols can also be used.

(iv) Water-Dispersibility Enhancing Compounds

Polyurethanes are generally hydrophobic and not water-dispersible. Therefore, at least one water-dispersibility enhancing compound (i.e., monomer), which has at least one, hydrophilic, ionic or potentially ionic group is optionally included in the polyurethane polymers and prepolymers of this invention to assist dispersion of the polymer/prepolymer in water. Typically, this is done by incorporating a compound bearing at least one hydrophilic group or a group that can be made hydrophilic (e.g., by chemical modifications such as neutralization) into the polymer/prepolymer chain. These compounds may be of a nonionic, anionic, cationic or zwitterionic nature or the combination thereof. For example, anionic groups such as carboxylic acid groups can be incorporated into the prepolymer in an inactive form and subsequently activated by a salt-forming compound, such as a tertiary amine defined more fully hereinafter, in order to create a prepolymer having an acid number from about 1 to about 60 mgKOH/gram, typically 1 to about 40, or even 10 to 35 or 12 to 30 or 14 to 25. Other water-dispersibility enhancing compounds can also be reacted into the prepolymer backbone through urethane linkages or urea linkages, including lateral or terminal hydrophilic ethylene oxide or ureido units.

Water dispersability enhancing compounds of particular interest are those which can incorporate carboxyl groups into the prepolymer. Normally, they are derived from hydroxy-carboxylic acids having the general formula $(HO)_xQ(COOH)_y$, wherein Q is a straight or branched hydrocarbon radical containing 1 to 12 carbon atoms, and x and y are 1 to 3. Examples of such hydroxy-carboxylic acids include dimethylolpropanoic acid (DMPA), dimethylol butanoic acid (DMBA), citric acid, tartaric acid, glycolic acid, lactic acid, malic acid, dihydroxymalic acid, dihydroxytartaric acid, and the like, and mixtures thereof. Dihydroxy-carboxylic acids are more preferred with dimethylolproanoic acid (DMPA) and dimethylol butanoic acid (DMBA) being most preferred.

Another group of water-dispersability enhancing compounds of particular interest are side chain hydrophilic monomers. Some examples include alkylene oxide polymers and copolymers in which the alkylene oxide groups have from 2-10 carbon atoms as shown, for example, in U.S. Pat. No. 6,897,281, the disclosure of which is incorporated herein by reference.

Water dispersability enhancing compounds can impart cationic nature onto polyurethane. Cationic polyurethanes contain cationic centers built into or attached to the backbone. Such cationic centers include ammonium, phosphonium and sulfonium groups. These groups can be polymerized into the backbone in the ionic form or, optionally, they can be generated by post-neutralization or post-quaternization of corresponding nitrogen, phosphorous, or sulfur moieties. The combination of all of the above groups can be used as well as their combination with nonionic stabilization. Examples of amines include N-methyldiethanol amine and aminoalcohols available from Huntsman under Jeffcat® trade name such as DPA, ZF-10, Z-110, ZR-50 and alike. They can make salts with virtually any acid. Examples of acid include hydrochloric, sulfuric, acetic, phosphoric, nitric, perchloric, citric, tartaric, chloroacetic, acrylic, methacrylic, itaconic, maleic acids, 2-carboxyethyl acrylate and other. Quaternizing agents include methyl chloride, ethyl chloride, alkyl halides, benzyl chloride, methyl bromide, ethyl bromide, benzyl bromide, dimethyl sulfate, diethyl sulfate, chloroacetic, acids and alike. Examples of quaternized diols include dimethyldiethanolammonium chloride and N,N-dimethyl-bis(hydroxyethyl) quaternary ammonium methane sulfonate. Cationic nature can be imparted by other post-polymerization reactions such as, for example, reaction of epoxy quaternary ammonium compounds with carboxylic group of DMPA.

Other suitable water-dispersability enhancing compounds include thioglycolic acid, 2,6-dihydroxybenzoic acid, sulfoisophthalic acid, polyethylene glycol, and the like, and mixtures thereof.

Although the use of water-dispersability enhancing compounds is preferred, dispersions of the present inventions can be prepared without them by using high-shear dispersing methods and stabilizing by surfactants.

Chain Extenders for Prepolymer

As a chain extender for prepolymer, at least one of organic polyols having an average of about 2 or more alcohol groups, polyalcohols with number-average molecular weight below about 500 g/mol, or combinations thereof is suitable for use in this invention. Suitable diol for use as a chain extender are the same as described as monomers for making polyester polyol and are listed above. Polyester polyols with number-average molecular weight below about 500 g/mol can also be used as prepolymer chain extenders. In some cases, amines described below as chain extenders for dispersion may also be used.

Chain Extenders for Dispersion

The aqueous nanoparticle/prepolymer composite particle dispersions produced as described above can be used as is, if desired. Alternatively, they can be chain extended to convert the prepolymers in the composite particles to more complex polyurethanes such as poly(urethane-urea)s.

As a chain extender, at least one of water, inorganic or organic polyamine having an average of about 2 or more primary and/or secondary amine groups, polyalcohols, or combinations thereof is suitable for use in this invention. Suitable organic amines for use as a chain extender include amines listed above and also diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for practice in this invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary and/or secondary amines, and the like, and mixtures thereof. Suitable inorganic amines include hydrazine, substituted hydrazines, and hydrazine reaction products, and the like, and mixtures thereof. Suitable polyalcohols include those having from 2 to 12 carbon atoms, preferably from 2 to 8 carbon atoms, such as ethylene glycol, diethylene glycol, neopentyl glycol, butanediols, hexanediol, and the like, and mixtures thereof. Suitable ureas include urea and it derivatives, and the like, and mixtures thereof. Hydrazine is preferred and is most preferably used as a solution in water. The amount of chain extender typically ranges from about 0.5 to about 1.1 equivalents based on available isocyanate.

(iv) Compounds having at least One Crosslinkable Functional Group

Compounds having at least one crosslinkable functional group can also be incorporated into the polyurethane prepolymers of the present invention, if desired. Examples of these optional compounds include those having carboxylic, carbonyl, amine, hydroxyl, epoxy, acetoacetoxy, olefinic and hydrazide groups, blocked isocyanates, and the like, and mixtures of such groups and the same groups in protected forms which can be reversed back into original groups from which they were derived.

Other suitable compounds providing crosslinkability include thioglycolic acid, 2,6-dihydroxybenzoic acid, and the like, and mixtures thereof.

(v) Catalysts

The prepolymer may be formed without the use of a catalyst if desired but catalyst may be preferred in some instances. Examples of suitable catalysts include stannous octoate, dibutyl tin dilaurate, and tertiary amine compounds such as triethylamine and bis-(dimethylaminoethyl) ether, morpholine compounds such as beta,beta-dimorpholinodiethyl ether, bismuth carboxylates, zinc bismuth carboxylates, iron (III) chloride, potassium octoate, potassium acetate and zirconium catalysts K-KAT® XC-9213 and K-KAT® 6212 from King Industries.

Some amine catalysts can be permanently incorporated into the backbone of polyurethane. These include N-methyl diethanolamine, N-ethyl diethanolamine, methicol, N,N-Bis (2-hydroxyethyl)isonicotinamide (BIN), JEFFCAT® DPA, JEFFCAT® ZF-10, JEFFCAT® ZR-50, JEFFCAT® Z-110 from Hunstman, and the like.

The preferred catalysts are DABCO® (diazabicyclo[2.2.2] octane), from Air Products, a mixture of 2-ethylhexanoic acid and stannous octoate, e.g., FASCAT® 2003 from Elf Atochem North America., JEFFCAT® DPA from Hunstman, and K-KAT XC-9213 from King Industries.

(vi) Isocyanate Blocking Agents

Several types of compounds can be employed as blocking (a.k.a. protecting or masking) agents. Their function is to temporarily protect isocyanate groups from undesired reactions. The main requirement for the blocking compound is for its reaction with isocyanate to be reversible. When the reaction is reversed, the isocyanate group is regenerated and is available for further reactions. The reverse reaction can be triggered by physical or chemical means, for example, by elevated temperatures, radiation, vacuum, catalysts, compounds with active hydrogen, or combinations thereof.

Examples of blocking agents include oximes, phenols, alcohols, lactams, imidazoles, pyrazoles, acids, mercaptanes, imides, secondary amines, sulfites, acetoacetates and derivatives of malonic acid.

Oximes are generally preferred but can be replaced partially or in full by other blocking agents. Oximes can be represented by a general formula $CRR'=NOH$, where R and R' may independently be H or $C_nH_{2n+1}$. R and R' may also contain cycloaliphatic, aromatic groups, and groups with heteroatoms including heterocyclic groups. The oxime may be an aldoxime when one or both R and R' are hydrogen, or ketoxime when both R and R' are hydrocarbyl groups. Examples of aldoximes include formaldoxime, acetaldoxime, propionaldoxime, butyraldoxime, benzaldoxime and the like. Examples of ketoximes include acetoxime, butanone oxime, cyclohexanone oxime, acetophenone oxime and the like.

Other preferred blocking agents include lactams, secondary and tertiary alcohols, pyrazoles and their mixtures. Some specific examples of other suitable blocking agents include dimethyl malonate, triazole, caprolactam, phenol, dimethylpyrazole, dibutylamine, diisopropylamine, tert-butanol, cyclohexanol, and isopropanol. Combinations of two or more blocking agents can be used if a stepwise reaction is desired, particularly mixtures of blocking agents which deblock at different temperatures.

The deblocking may occur during chain extension or during polymer drying and/or curing. Often it is preferred to use a blocking agent, which will evaporate from the polymer during drying or curing. In these cases, low molecular weight oximes such as acetoxime, butanone oxime, butyraldoxime and the like are preferred.

(vii) Ingredient Proportions

Normally, the prepolymer produced by the present invention will be isocyanate-terminated. For this purpose, the ratio of polyisocyanate to multi-functional isocyanate-reactive compound (both ester-containing and ester-free) in the prepolymer typically ranges from about 1.3/1 to about 2.5/1, preferably from about 1.5/1 to about 2.1/1, and more preferably from about 1.7/1 to about 2/1, on an equivalent basis. In this context, "equivalent basis" means the total number of reactive isocyanate moieties of the polyisocyanate versus the total number of isocyanate-reactive moieties of the multi-functional isocyanate-reactive compound or compounds. In other cases, prepolymer can be produced with all isocyanate groups reacted away. In this case, a stoichiometric excess of isocyanate-reactive compounds over isocyanates is used.

In many embodiments of this invention, the multi-functional isocyanate-reactive compound component will be composed entirely of one or more ester-containing multi-functional isocyanate-reactive compounds, as described above. In other embodiments, $\leq 50\%$, more typically $\leq 40\%$, $\leq 30\%$, $\leq 20\%$ or even $\leq 10\%$ of the multi-functional isocyanate-reactive compound component on an equivalent basis can be composed of one or more ester-free multi-functional isocyanate-reactive compounds. Embodiments in which $\geq 10\%$, $\geq 20\%$, $\geq 30\%$, and even $\geq 40\%$, of the multi-functional isocyanate-reactive compound component basis are ester-free are contemplated. In other embodiments, $\geq 10\%$, $\geq 20\%$, $\geq 30\%$, $\geq 40\%$, $\geq 50\%$, $\geq 60\%$ and even $\geq 75\%$, of the multi-functional isocyanate-reactive compound component (macroglycol) basis are ester containing components.

The typical amount of optional water-dispersability enhancing compound in the prepolymer depends on its nature and can be as high as about 70 wt. % for nonionic compounds, typically from about 1 wt. % to about 30 wt. %, and especially from about 2 wt. % to about 10 wt. % based on the total weight of the prepolymer for ionic or potentially ionic compounds. See, our U.S. Pat. No. 6,897,281, the entire disclosure of which is incorporated herein by reference.

The amount of optional compounds having crosslinkable functional groups in the prepolymer will typically be up to about 1 milliequivalent, preferably from about 0.05 to about 0.5 milliequivalent, and more preferably from about 0.1 to about 0.3 milliequivalent per gram of final polyurethane on a dry weight basis.

The amount of catalyst used to form the prepolymer, if used at all, will typically be from about 5 to about 200 parts per million of the total weight of prepolymer reactants.

Forming the Aqueous Dispersion

The polyester polyurethane prepolymer of this invention is formed in a conventional way, such as by combining the above ingredients together and allowing them to react for a suitable period of time, normally with suitable mixing. Thereafter, the prepolymer so formed, which is usually in the form of a syrupy liquid, can then be converted into an aqueous dispersion in conventional way such as by combining the prepolymer with water with suitable mixing, for example. Optional emulsifiers (surfactants) can be included, if desired. Where solvent polymerization is employed, the solvent and other volatile components can optionally be distilled off from the final dispersion, if desired.

Before continuing with discussion of the preferred process, it is noted that other processes can also be used to manufacture the polyurethane dispersions of the present invention, including but not limited to the following:

1. Dispersing prepolymer by shear forces with emulsifiers (external emulsifiers, such as surfactants, or internal emulsifiers having anionic and/or cationic groups as part of or pendant to the polyurethane backbone, and/or as end groups on the polyurethane backbone).
2. Acetone process. A prepolymer is formed with or without the presence of acetone, MEK, and/or other polar solvents that are non-reactive and easily distilled. The prepolymer is further diluted in said solvents as necessary, and chain extended with an active hydrogen-containing compound. Water is added to the chain-extended polyurethane, and the solvents are distilled off. A variation on this process would be to chain extend the prepolymer after its dispersion into water.
3. Melt dispersion process. An isocyanate-terminated prepolymer is formed, and then reacted with an excess of ammonia or urea to form a low molecular weight oligomer having terminal urea or biuret groups. This oligomer is dispersed in water and chain extended by methylolation of the biuret groups with formaldehyde.
4. Ketazine and ketimine processes. Hydrazines or diamines are reacted with ketones to form ketazines or ketimines. These are added to a prepolymer, and remain inert to the isocyanate. As the prepolymer is dispersed in water, the hydrazine or diamine is liberated, and chain extension takes place as the dispersion is taking place.
5. Continuous process polymerization. An isocyanate-terminated prepolymer is formed. This prepolymer is pumped through high shear mixing head(s) and dispersed into water and then chain extended at said mixing head(s), or dispersed and chain extended simultaneously at said mixing head(s). This is accomplished by multiple streams consisting of prepolymer (or neutralized prepolymer), optional neutralizing agent, water, and optional chain extender and/or surfactant.
6. Reverse feed process. Water and optional neutralizing agent(s) and/or extender amine(s) are charged to the prepolymer under agitation. The prepolymer can be neutralized before water and/or diamine chain extender are added.

In one embodiment of the invention, where the prepolymer includes enough water-dispersability enhancing compound to form a stable dispersion without added emulsifiers (surfactants), the dispersion can be made without such compounds, i.e., substantially free of surfactants, if desired. The advantage of this approach is that the coatings or other products made from the polyurethane exhibit less water sensitivity, better film formation, less foaming and reduced growth of mold, bacteria and so forth.

In those instances in which the prepolymer includes water-dispersibility enhancing compounds with pendant carboxyl groups, these carboxyl groups can be neutralized by converting them to carboxylate anions for enhancing the water-dispersibility of the prepolymer.

Suitable neutralizing agents for this purpose include tertiary amines, metal hydroxides, ammonium hydroxide, phosphines, and other agents well known to those skilled in the art. Tertiary amines and ammonium hydroxide are preferred, such as triethyl amine (TEA), dimethyl ethanolamine (DMEA), N-methyl morpholine, and the like, and mixtures thereof. It is recognized that primary or secondary amines may be used in place of tertiary amines, if they are sufficiently hindered to avoid interfering with the chain extension process.

The aqueous polyester polyurethane prepolymer dispersions obtained in the manner described above, whether or not neutralized, can be used as is to provide coatings, films and other solid polyurethane products. Additionally or alternatively, these dispersions can be treated in a conventional way to chain extend the prepolymers therein to form poly(urethane-urea)s. For this purpose, water, inorganic and/or organic polyamines having two or more primary and/or secondary amine groups, polyalcohols, or combinations thereof can be used. Suitable organic amines for use as a chain extender include diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for practice in this invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary and/or secondary amines, and the like, and mixtures thereof. Suitable inorganic amines include hydrazine, substituted hydrazines, and hydrazine reaction products, and the like, and mixtures thereof. Suitable polyalcohols include those having from 2 to 12 carbon atoms, preferably from 2 to 8 carbon atoms, such as ethylene glycol, diethylene glycol, neopentyl glycol, butanediols, hexanediol, and the like, and mixtures thereof. Hydrazine and ethylene diamine are preferred and are most preferably used as a solution in water. The amount of chain extender typically ranges from about 0.5 to about 1.1 equivalents based on available isocyanate.

The aqueous polyester polyurethane dispersions obtained in this way can also be used "as is" to provide coatings, films and other solid polyurethane products.

Nanoparticle Proton Scavengers

In accordance with this invention, it has been found that the susceptibility of polyester polyurethanes to degrade through hydrolysis can be essentially completely eliminated by incorporating into the polymer a substantially dispersed nanoparticle (referring to the aggregate and/or the ultimate particles/crystallite) proton scavenger.

Certain materials are known to react with, bind to, or otherwise capture protons, i.e., hydrogen ions, when exposed thereto in solid, liquid and/or gaseous media. Calcium carbonate, is a good example as are the other alkali and earth-alkali metal carbonates, i.e., $Li_2CO_3$, $BeCO_3$, $MgCO_3$, $SrCO_3$, $BaCO_3$, and $RaCO_3$. Other examples of carbonates which will scavenge protons include carbonates of Fe(II), Fe(III), Mn(II), Zn, Ag, Hg(I), Hg(II), Cu(II), Pb(II), Bi(III).

Calcium carbonate has formula $CaCO_3$. It is a common substance found in rock in all parts of the world, and is the main component of shells of marine organisms, snails, pearls, and eggshells. Calcium carbonate is found naturally as the following minerals and rocks: aragonite, calcite, vaterite or (μ-CaCO3), chalk, limestone, marble, travertine. The vast majority of calcium carbonate used in industry is extracted by mining or quarrying. Pure calcium carbonate (e.g., for food or pharmaceutical use), can be produced from a pure quarried source (usually marble). Ground calcium carbonate (GCC) is produced through mechanical grinding of naturally occurring calcium carbonate rocks: marble, limestone and chalk. GCC in pigment formulations provides good rheology and high brightness at low cost. Alternatively, crude calcium carbonate is calcinated into calcium oxide (quicklime). Water is added to give calcium hydroxide, and carbon dioxide is passed through this solution to precipitate the desired calcium carbonate, known as precipitated calcium carbonate (PCC). This process produces very pure calcium carbonate crystals. The crystals can be tailored to a variety of different shapes and sizes, depending on the specific reaction process used. The three main shapes of PCC crystals are aragonite, rhombohedral, and scalenohedral. Within each crystal type, the PCC process can control mean particle size, size distribution, and surface area. Precipitated calcium carbonate is used as a mineral pigment throughout the world for paper production. It is valued for its high brightness and light scattering characteristics in paper filling and coating applications.

Other examples of inorganic compounds which will scavenge protons include silicates of Ba, Ca, Mg, Al, Cr(III), Fe(II), Fe(III), Mn(II), Zn, Ag, Cu(II), Pb(II); sulfides of Fe(II), Mn(II), Zn, Ag, Hg(I), Hg(II), Cu(II), Pb(II), Bi(III), Sn(II); oxides and hydroxides of the above metals; and hydroxyapatite, which is a naturally occurring mineral form of calcium apatite.

Examples of organic compounds which will scavenge protons include 1,8-bis-(dimethylamino)naphthalene, 1,8-bis (hexamethyltriaminophosphazenyl)naphthalene and 2,6-di-tert-butylpyridine.

Any combination of the above scavenges may be used.

In accordance with this invention, it has been found that these proton scavengers materials form will substantially reduce or even completely eliminate the susceptibility of polyester polyurethanes to degrade though hydrolysis without introducing any significant haze into the polymer, but only if they are incorporated into the polymer in a substantially dispersed nanoparticle and/or high surface area form.

In this regard, nanoparticles are typically obtained commercially in powder or dispersion form, both aqueous and organic. Although the individual/primary (crystallites for $CaCO_3$) particles in these products may be in the nano size range, these particles usually combine into larger agglomerates in which the nanoparticles are relatively closely-packed with one another usually in three dimensions. Therefore, when these nanoparticle powders and dispersions are used to make nanoparticle-containing polymers, the nanoparticles remain in the form of these larger agglomerates. In other words, the nanoparticles are not substantially dispersed in the polymer mass. In accordance with this invention, it has been found that proton scavenger nanoparticles will substantially reduce or even completely eliminate the susceptibility of polyester polyurethanes to degrade though hydrolysis, but only if they are incorporated into the polymer mass ultimately formed in a substantially dispersed and/or high surface area form.

In this context, "substantially dispersed" means that, although the individual nanoparticles may not be completely separated from one another, they nonetheless are not closely-packed with one another either. An example of such an arrangement is illustrated in FIGS. 1A, 1B and 1C which are photomicrographs taken of the nanoparticle-containing polyester polyurethane product of Examples 1-5 below. As shown in these figures, the individual nanoparticles in this product are loosely arranged in small, essentially linear, "snake-like" aggregates uniformly distributed throughout the polymer mass, these "snake-like" aggregates typically containing ≦100, more typically ≦50, ≦40, ≦30, or even ≦20, nanoparticles. As further shown in these figures, although the individual nanoparticles in a "snake" may touch adjacent nanoparticles in the same snake, these "snakes" are separated from one another. Thus, the surface area of each nanoparticle, except where each touches the adjacent nanoparticles in the same snake, are in direct contact with the polymer mass. Such a structure would be anticipated to have a high nitrogen BET surface area.

Figure 2:
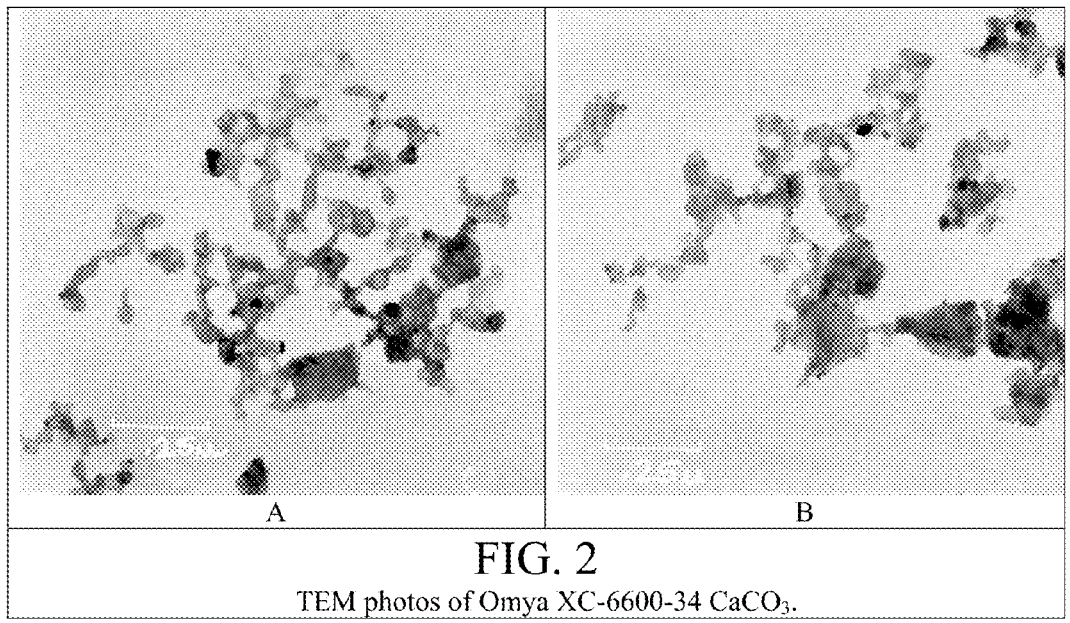
FIGS. 2A and 2B are photomicrographs of Omya XC-6600-34 $CaCO_3$.

Another example of substantially dispersed (but loosely aggregated having a high surface area (e.g. 41 m²/g) arrangement is shown in FIGS. 2A and 2B. The primary nano crystallites of Omya XC-6600-34 from Omya form flocks of various shape and dimensions with a substantial portion of the surface exposed to the matrix they are in. From this perspective, the most effective form of flocculation is a trains or chains of particles. Such an arrangement into relatively large floc particles can introduce some haze to the nanocomposites, but will still be effective in retarding ester hydrolysis because large portion of the nanoparticles surfaces is exposed to the matrix.

This arrangement is in direct contrast to the structure of the larger agglomerates of conventionally prepared nanoparticles in which the nanoparticles are relatively closely packed in all three dimensions. Thus, these larger agglomerate typically contain many nanoparticles, e.g., 1,000 or more, arranged in multiple layers whereby the length, width and depth of the agglomerate is typically many multiples of a single nanoparticle diameter. In this arrangement, the vast majority of the surface area of each nanoparticle is blocked or hindered from contact with the polymer mass by the other nanoparticles in the agglomerate. In contrast, the width and depth of the "snake-like" aggregates of FIGS. 1A, 1B and 1C are generally on the same order as a single nanoparticle diameter, or perhaps two nanoparticle diameters, because of the "snake-like" structure of these aggregates. As a result, the vast majority of the surface area of each nanoparticle in these aggregates is open and available for direct contact with the polymer mass. This allows this vast majority of open surface area to be effective in capturing fugitive protons (hydrogen ions) in the polymer mass, which in turn stabilizes the polyester polyurethane polymer against degradation by hydrolysis essentially completely.

Without limiting the scope of the present invention, we hypothesize that the long, snake-like nanoparticle agglomerates of this invention scatter light substantially less than conventional nanoparticle agglomerates which are much more three-dimensional in nature, i.e., their size is fairly uniform in all three dimensions. This is because the intensity of scattered light is proportional to the surface area of the projection of a particle onto the plane perpendicular to the direction of light. For equiaxial particles all projections are about the same, while for the long, snake-like nanoparticle agglomerates of this invention, the projection in two out of three dimensions is negligible. We speculate that this phenomenon could be the reason for very low haze and high clarity of the inventive nanoparticle/polyester polyurethane composites of this invention.

As explained later in the application the surface area increases inversely to the ultimate particle/crystallite diameter (e.g., the surface area theoretically increases by a factor of 10 each time the ultimate particle size decreases by a factor of 10). Thus, it is desirable to get very small ultimate particle/crystallite sizes as it is believed that surface area is very important in getting maximum proton scavenging ability per gram of proton scavenger. Particle sizes can be difficult to understand and one needs to use consistent terminology to define particle sizes. In this discussion of proton scavengers, we will use weight average particle diameters for the ultimate particle/crystallite sizes. Weight and volume averages are convertible if one knows the density. Usually there is a distribution of particle diameters. When we refer to particle diameters, our preference is that at least 50 weight percent ($D_{50}$) of the particles are smaller than the specified diameter (averaging the x, y, and z directions for each particle). In another range, we might specify the at least 90 weight percent ($D_{90}$) of the particles are smaller than the specified diameter. All diameters for primary particles or crystallites will be by transmission electron microscope (TEM) and calculations based on the TEM images.

In one embodiment where the ultimate particle/crystallite diameter is small, desirably the $D_{50}$ is less than 1 micron, more desirably less than 500 nm, more desirably less than 100 nm, and preferably less than 50 nm. In a similar embodiment, desirably the $D_{90}$ is less than 1 micron, more desirably less than 500 nm, more desirably less than 100 nm, and preferably less than 50 nm. In one embodiment, the nitrogen BET surface area is greater than 20 m²/g; more desirably greater than 30 m²/g; still more desirably greater than 35 m²/g and preferably about 40 or more m²/g.

It should also be appreciated that one or more chemical reactions may occur between the surfaces of proton scavenger nanoparticles in the inventive nanocomposite and the polyester-polyurethane polymer of this composite, or at least some of the components of the prepolymer forming this polymer such as, for example, the reaction of isocyanates with hydroxyl groups on nanoparticle surfaces. To this end, the surfaces of these proton scavenger nanoparticles can be intentionally modified by known technology, if desired, such as by grafting reactive groups such as silanes, alcohols, carbonyls, thiols, etc., as well as inert groups which modify the surface tension and provide for compatibility with polymeric matrix, for example, hydrophobic hydrocarbon, siloxane and fluorinated groups.

Using Proton Scavenger Nanoparticles already in a Substantially Dispersed Form

A variety of approaches can be used for incorporating proton scavenger nanoparticles into the inventive polyester-polyurethane nanocomposites in the desired substantially dispersed form. One approach is to select proton scavenger nanoparticles which are already in a substantially dispersed form and then combine these substantially dispersed proton scavenger nanoparticles with one or more ingredients used to form this polymer composite.

Proton scavenger nanoparticles which are already in a substantially dispersed form can be obtained in a variety of different ways. For example, some proton scavenger nanoparticles are created in a substantially dispersed nanoparticle form as part of their manufacturing process. An example of such a manufacturing process is the overbasing technology in which highly basic lubricant additives soluble and/or dispersible in various organic media are made by combining acid gases with metal bases. See, for example, WO 2004/048484, the entire disclosure of which is incorporated herein by reference, which describes how calcium carbonate and other similar materials can be made in this way. See, also, the many additional patents cited in WO 2004/048484, especially on page 5, which describe how many other highly basic materials particulate materials, both organic and inorganic, can be made with overbasing technology.

Other manufacturing techniques that will create proton scavenger nanoparticles in a substantially dispersed form as part of their manufacturing process include precipitation techniques, crystallization and recrystallization techniques, chemical vapor deposition techniques, and plasma gas processes in which particles are grown out of gas phase either on a substrate or directly in the gas phase as described, for example, in U.S. Pat. No. 5,514,349 and U.S. Pat. No. 6,669,823. Sol-gel processes in which insoluble particles are formed from a soluble precursor as a result of a chemical reaction can also be used. See, L. L. Hench., "Sol-Gel Technology," in: Kirk-Othmer Encyclopedia of Chemical Technology. $4^{th}$ Edn., Vol. 22, J. I. Kroschwitz and M. Howe-Grant Eds., pp. 497-528 (1997).

Another approach for obtaining proton scavenger nanoparticles already in the desired substantially dispersed form is to generate these substantially dispersed proton scavenger nanoparticles from a precursor material made from larger particles and/or agglomerates of these nanoparticles.

For example, such precursor materials can be comminuted (mechanically broken up) by grinding in a bead mill, especially small-media bead mills using grinding media as small as 30 microns in size. Such mills are usually comprised of a horizontal grinding chamber having a milling shaft on the inside and a temperature control jacket on the outside. The chamber is filled with different amounts of round beads or other grinding media, and a suspension of the precursor material in a liquid is pumped through the agitated fluidized media by a pump. The precursor material enters the milling chamber and is broken down through collision with the grinding media and with itself. Fully dispersed nanoparticles which are generated as a result of these collisions are separated from the grinding media by a fine mesh filter at the end of the mill which keeps the beads and larger unground particles from leaving the milling chamber.

Other comminution techniques that can also be used include cavitation techniques such as the controlled flow cavitation (CFC) technologies described in U.S. Pat. No. 5,931,771 and U.S. Pat. No. 7,314,516, and sonication techniques in which high-intensity ultrasound produces the cavitations as described, for example, in K. S. Suslick. "Sonochemistry" in: Kirk-Othmer Encyclopedia of Chemical Technology, $4^{th}$ Edn., Supplement Vol., J. I. Kroschwitz and M. Howe-Grant Eds., pp. 516-541 (1998).

In addition to mechanical techniques, chemical techniques can also be used for breaking apart larger precursor materials into smaller nanoparticles having the desired substantially dispersed form. Such techniques are well known and described in a variety of different publications including U.S. 2005/0175649, U.S. 2007/0085231 and U.S. Pat. No. 7,501,4668, the entire disclosures of which are also incorporated herein by reference. See, also, U.S. Pat. No. 7,285,583, U.S. 2007/0106005, U.S. 2006/0293430, U.S. 2008/0103459, U.S. 2008/0161496, U.S. 2008/0156438, and U.S. 2009/0133826, the disclosure of which are also incorporated herein by reference.

Generally speaking, these chemical techniques involve treating the preliminary material in an aqueous or organic dispersion with a substance which is capable of seeping into and then enlarging the spaces between the adjacent particles, or the adjacent layers of material in the case of laminar minerals, ("intercalation"), followed by allowing the treated dispersion to mature so that these adjacent particles/layers completely separate from one another ("exfoliation"). See, especially, paragraph [0051] of the above-noted U.S. 2007/0085231. In some instances, mixing of the dispersion may be used to promote exfoliation, such mixing ranging from simple agitation to vigorous shear mixing. A particular advantage of this approach is that it can be done using aqueous dispersions which are free or essentially free of the organic solvents or other organic media that are normally used in the overbasing technology described above, which may be desirable in some situations for environmental reasons.

In one embodiment, the particle size of the proton scavenger nanoparticles when in the substantially dispersed form desired by this invention can vary widely, and essentially any particle size in the nanoparticle size range can be used. For the purposes of the present invention, nano particles and substantially dispersed nanoparticles are defined as particles which have at least one of the three dimensions of less than about 250 nm ($D_{90}$) but will normally be less than about 150 nm. In other embodiments, the mean particle size will be about 100 nm or less ($D_{90}$), 75 nm or less, or even 50 nm or less. In some embodiments, the particle size may even be as low as 25 nm or less, 10 nm or less, or even 5 nm or less. In general, the mean particle size, $D_{50}$, of these substantially dispersed nanoparticles may be as large as 250 nm (nanometers) but will normally be less than 100 nm. Substantially dispersed nanoparticles having a mean particle size of about 75 nm or less, more typically 50 nm or less, or even 40 nm or less are interesting. In other embodiments, the mean particle size will be 30 nm or less, 25 nm or less, or even 10 nm or less. In some embodiments, the particle size may even be as low as 5 nm or less, 2 nm or less, or even 1 nm or less.

Particle size distribution can be measured by one of the following techniques: Sieve analysis, photoanalysis, optical counting, electroresistance counting, sedimentation, laser diffraction methods, acoustic spectroscopy or ultrasound attenuation spectroscopy. In the context of this disclosure, particle sizes and particle size distributions of substantially dispersed nano particles refer to measurements determined by transmission electron microscopy (TEM). TEM is one of the most reliable tools of measuring the dimensions of particles and their aspect ratios.

The elucidation of particle size distribution can be done from the TEM photographs manually by measuring each and all particles in the picture or by computers with the use of specialized image recognition systems. Examples include Scion Image from Scion Corp. (http://www.scioncorp.com/pages/scion_image_windows.htm) and ImageJ from U.S. Department of Health and Human Services, National Institutes of Health (http://rsb.info.nih.gov/ij/). Supplementary Table contains the list of other available image analysis software and libraries.

Averaging methods for particle size distribution include number, weight, volume, hydrodynamic volume, intensity of scattered light and surface averaging. Particle size distribution also can be presented in various ways: Median size, geometric mean size, average size, D50, D90, and so on. The breadth of the particle size distribution is usually described by a polydispersity index (PDI).

Moreover, as appreciated by skilled polymer chemists, although particle size represents an imaginary sphere with a uniform thickness, most solid particles in the nanoparticle size range are just as likely to be irregular in shape and non-spherical. In extreme cases, these particles can have a large aspect ratio in one or two dimensions such as carbon nano tubes (CNTs and MWCNTs), cellulosic whiskers, graphene, clay, talc, etc. In the context on the present invention, reference to particle size distribution in the terms of nanometers refers to the diameter of an imaginary spherical particle with equivalent to actual particle volume.

Particle size is usually characterized by particle size distribution, since all particles in a batch of particles do not have an identical particle size. Thus, in some embodiments of the invention, it is desirable that the nanoparticle batch have a $D_{90}$ of less than 250 nm (i.e., 90% of volume of the particles in the batch have equivalent diameters less than 250 nm). Nanoparticle batches with $D_{90}$'s of 150 nm or less, 100 nm or less, more typically 75 nm or less, or even 50 nm or less, 25 nm or less, 10 nm or less, or even 5 nm or less are especially interesting.

Of particular interest are nanoparticle batches having $D_{90}$'s of about 100 nm or less, and especially 75 nm or less, or even 50 nm or less, since nanoparticles of this size when substantially dispersed in a polymer matrix become essentially transparent to the naked eye.

In the experimental section context of this disclosure, particle sizes and particle size distributions of polyurethane-nano particle dispersions refer to measurements determined by laser light scattering using a Submicron Particle Sizer Autodilute PAT Model 370 (NICOMP Particle Sizing Systems) using an intensity average with Gaussian distribution. This is because laser light scattering measurements are quicker and less costly than TEM measurements measurement. Intensity averaging is chosen because it is skewed towards larger particle sizes according to the Rayleigh law, and it is the larger particles that are mostly responsible for gravitational instability of dispersions.

Surface Area vs. Particle Size

Surface area and particle size are very closely related. Consider an ideal case of uniformly sized spherical particles which have no contact with each other. Given that d=W/V, $V=4\pi R^3/3$, $S=4\pi R^2$, and D=2R, where d—specific density, W—sample weight, V—sphere volume, S—sphere surface, R—radius, D—diameter, the following equation relating total surface area of a sample with the particles size can be derived:

$$S = 6 W/(D*d)$$

For W expressed in grams, D in nm, and d in g/sm$^3$, it becomes $$S = 6{,}000 \, W/(D*d) \, (m^2/g)$$

The table below summarizes some representative calculation results for d=1 g/sm$^3$.

| P.S., nm | Surface area m$^2$/g |
|---|---|
| 10 | 600 |
| 20 | 300 |
| 30 | 200 |
| 40 | 150 |
| 50 | 120 |
| 100 | 60 |
| 200 | 30 |
| 500 | 12 |
| 1000 | 6 |

The hyperbola which represents this relationship is shown on Supplementary Figure. A dramatic increase in specific surface area is observed for values below ~200-250 nm.

This direct relationship between specific surface area and particle diameter becomes more complex and often impossible to theoretically elucidate for polydisperse particles with irregular shapes especially when particles are partially fused or flocculated. Discussion of some complex arrangements for particle assemblies and associated nomenclature can be found in DIN 53206 "Testing of pigments; particle size analysis, basic terms" by Deutsches Institut fur Normung (German Institute for Standardization).

In still another approach for obtaining proton scavenger nanoparticles already in the desired substantially dispersed form, nanoparticles which are present in one type of medium (e.g., an organic liquid) in this desired substantially dispersed form are solvent exchanged in order to generate a dispersion of these substantially dispersed nanoparticles in a different medium (e.g., water).

As further discussed below, in some embodiments of this invention it is desirable that the proton scavenger nanoparticles be dispersed in water when combined with the polyester-polyurethane (or one of its ingredients). In other embodiments, it may be desirable that the proton scavenger nanoparticles be dispersed in an organic medium, or at least water-free, when so combined. Solvent exchanging is a well-known procedure by which one dispersing medium is exchanged for another. Where proton scavenger nanoparticles already in the desired substantially dispersed form are obtained in the manner described above, and where the liquid medium dispersing these nanoparticles is different from the liquid medium desired when combining these nanoparticles with the polyester-polyurethane (or one of its ingredients), the liquid medium in the proton scavenger nanoparticle dispersion can be solvent exchanged with the liquid medium desired.

Stabilizing Nano Dispersions

During formation of nano particles, a very significant area of new surface is created. If this surface is not stabilized, the particles will tend to re-agglomerate. There are two mechanisms of particle stabilization: Electrostatic or ionic, entropic or steric, and combination of the two. The electrostatic charge can be imparted onto inorganic particles by treating them with organic (e.g., formic, oxalic) or inorganic (e.g., HNO3, HCl, HClO4) acids or bases (e.g., ammonia, amines, caustic). Special stabilizing agents or dispersants are added to dispersions to impart stability. They can be characterized by the polymer type (acrylate, ether, ester, urethane, urea, etc.); architecture (head-and-tail, random, block-, comb-, gradient- and star-copolymers); molecular weight and molecular weight distribution; number, nature and length of arms; anionic, cationic, nonionic and zwitterionic nature; type and density of functional and reactive groups.

A number of commercially available dispersants may be used such as Solsperse® 46000, Solsperse® 4190, Solplus® D540 (all from Lubrizol), or Dispersbyk™ 190 (from Byk Chemie in Wesel, Del.).

Combining Proton Scavenger Nanoparticles already in a Substantially Dispersed Form with the Polyester-Polyurethane Polymer Once proton scavenger nanoparticles which are already in a substantially dispersed form have been obtained as indicated above, they can be incorporated into the inventive polyester-polyurethane nanocomposite in a variety of different ways.

For example, these substantially dispersed proton scavenger nanoparticles can be added to (a) the prepolymer forming the polyester polyurethane polymer of the inventive nanocomposite before the prepolymer is combined with water for forming the aqueous dispersion, (b) this prepolymer after this prepolymer is combined with water for forming this aqueous dispersion, (c) one or more ingredients of this prepolymer before it is formed, (d) the aqueous dispersion of the complex polyester polyurethane polymer obtained by chain extending this prepolymer, and (e) the aqueous medium into which this prepolymer is dispersed, and (f) combinations thereof.

Both aqueous and organic dispersions of these substantially dispersed proton scavenger nanoparticles can be used for this purpose.

In a particularly interesting embodiment of this invention, the approach described in U.S. Pat. No. 7,598,315, is used.

The entire disclosure of this document is incorporated herein by reference. As described there, aqueous dispersions of polyurethane prepolymer/nanoparticle composites are made by combining these ingredients in the substantial absence of water and then dispersing this blend in aqueous medium. As a result, the individual nanoparticle/prepolymer dispersed particles that are formed are composed of an intimate mixture of nanoparticles and the prepolymer, with separately dispersed nanoparticles normally being avoided. An advantage of this approach, at least where the prepolymer includes a water-dispersability enhancing compound, is that the dispersion can be made without added hydrophilic surfactants and dispersants, which may further contribute to water resistance of the polyester polyurethanes ultimately produced. Normally, dispersions of the proton scavenger nanoparticles in a suitable organic medium, with the nanoparticles being in the desired substantially dispersed form, will be used for this purpose.

Essentially any amount of substantially dispersed proton scavenger nanoparticles can be incorporated into the inventive polyester-polyurethane nanoparticle composite. Typically, the amount of nanoparticles added should be sufficient to achieve a noticeable effect on the hydrolytic stability of the polyester-polyurethane polymer in which they are contained. Depending on the particular polymer involved, concentration of these nanoparticles in the nanoparticle composite obtained can be as low as about 0.01 wt. %, based on the weight of the product nanoparticle composite as a whole (e.g. polyurethane, proton scavenger nanoparticles, and other optional additives in the polyurethane (exclusive of water or other solvent based media in polyurethane dispersions)). Minimum concentrations on the order of about 0.05 wt. %, about 0.1 wt. %, about 0.25 wt. %, about 0.5 wt. %, about 0.7 wt. %, and even about 0.9 wt. % are more common. Similarly, the maximum concentration of these nanoparticles in the nanoparticle composite obtained can be as high as about 70 wt. %, on the same basis, although maximum concentrations on the order of about 25 wt. %, about 15 wt. %, about 10 wt. %, about 5 wt. %, about 3 wt. %, and even about 2.5 wt. % are more common. Concentrations on the order of about 0.1-15 wt. %, about 0.5-5 wt. %, or even about 1.0-2.5 wt. %, are more typical with the lower weight percentages being possible as the proton scavenger is available in smaller particle form with higher surface area.

Generating Substantially Dispersed Nanoparticles in the Presence of Another Ingredient Another approach that can be used for incorporating substantially dispersed proton scavenger nanoparticles into the polyester polyurethane polymer composites of this invention is to generate these substantially dispersed proton scavenger nanoparticles (or, more accurately, to generate the substantially dispersed form of these nanoparticles) in the presence of the prepolymer used to form the polyester-polyurethane of the inventive composite, or a component of this prepolymer. This can most conveniently be done by mechanically comminuting a precursor material made from larger particles and/or agglomerates of these nanoparticles, in the manner described above, but doing so in the presence of (i.e., with this precursor material mixed with) this prepolymer and/or a component of this prepolymer.

So, for example, a preliminary material comprising the proton scavenger in a larger particle size form, i.e., in the form of particles and/or agglomerates having a larger particle size that the nanoparticle size range desired here, can be milled in the presence of (i) the prepolymer forming the polyester polyurethane polymer of the inventive nanocomposite before this prepolymer is combined with water for forming an aqueous dispersion, (ii) this prepolymer after this prepolymer is combined with water for forming an aqueous dispersion, (iii) one or more ingredients of this prepolymer before it is formed, and (iv) aqueous media, and (v) combinations thereof.

In those situations in which the nanoparticles are comminuted in the presence of the prepolymer, the prepolymer is desirably in a liquid (syrupy) form, as this prevents prepolymer particles from interfering with the comminuting operation.

In a particularly interesting embodiment of this invention, this approach of generating the fully dispersed form of these nanoparticles in the presence of the prepolymer or an ingredient of this prepolymer is done using the "absence of water" procedure of our U.S. Pat. No. 7,598,315, mentioned above. That is to say, the nanoparticles and the prepolymer (and/or a component of the prepolymer) are combined and comminuted in the substantial absence of water, after which the comminuted blend so formed is dispersed in aqueous medium. As indicated above, this "absence of water" procedure achieves an especially intimate mixture of nanoparticles and prepolymer, with separately dispersed nanoparticles normally being avoided. In addition, it allows prepolymers which include a water-dispersability enhancing comonomer to be dispersed without added hydrophilic surfactants and dispersants.

Additional Features

The polyurethane prepolymers, the product polyurethanes produced therefrom, and the aqueous nanoparticle/prepolymer composite particle aqueous dispersions of the present invention as described above can be made with various additional ingredients and features in accordance with known polyurethane technology. Examples include:

(i) Polymer Branching

Branching of the ultimate polymer product, as well as the prepolymer, can be accomplished for aiding tensile strength and improving resistance to creep—that is, recovery to that of or near its original length after stretching. In this regard, see U.S. Pat. No. 6,897,281, the disclosure of which has been incorporated herein by reference above.

(ii) Monofunctional Active Hydrogen-Containing Compounds

The prepolymers of this invention can also be made with monofunctional active hydrogen-containing compounds to enhance dispersibility of the prepolymer in aqueous medium and impart other useful properties, for example cross-linkability, as well as to adjust the morphology and rheology of the polymer when coated onto a substrate, as also described in the above-noted U.S. Pat. No. 6,897,281.

(iii) Plasticizers

The polyurethane prepolymers and ultimate polyurethane products of this invention can be prepared in the presence of a plasticizer. The plasticizer can be added at any time during prepolymer preparation or dispersion or to the polyurethane during or after its manufacture. Plasticizers well known to the art can be selected for use in this invention according to parameters such as compatibility with the particular polyurethane and desired properties of the final composition. See, for example, WO 02/08327 A1, as well as the above-noted U.S. Pat. No. 6,897,281.

(iv) Other Additives for Preparation of Dispersions

Other additives well known to those skilled in the art can be used to aid in preparation of the dispersions of this invention. Such additives include defoamers, antioxidants such as hindered phenols and amines (e.g., Irganox 1010), UV absorbers (e.g., carbon black, titanium dioxide, Tinuvin® P from Ciba-Giegy), stabilizers such as carbodiimide, (e.g., Staboxal P from Bayer), Satrastab from SATRA (Shoe and Allied Trades Assoc., Kettering, England), crosslinkers such as aziridines (Xama® -7), isocyanates, melamines, carbodiimides, epoxides, polyvalent metal ions (Zn, Zr, Ca, Al), epoxysilanes, adhesion promoters, leveling agents, fillers, extenders, other polymers, activators, curing agents, colorants, pigments, neutralizing agents, thickeners, non-reactive and reactive plasticizers, coalescing agents such as di(propylene glycol) methyl ether (DPM), waxes, slip and release agents, antimicrobial agents, surfactants such as Pluronic™ F68-LF and IGEPAL™ C0630 and silicone surfactants, metals, salts, flame retardant additives, antiozonants, and the like. They can optionally be added as appropriate before and/or during the processing of the dispersions of this invention into finished products as is well known to those skilled in the art. Additives may also be used as appropriate in order to make articles or to treat other products (such as by impregnation, saturation, spraying, coating, or the like). The dispersions of this invention typically have total solids of at least about 20 wt. %, preferably at least about 25 wt. % and more preferably at least about 30 wt. %.

(v) Blends with other Polymers and Polymer Dispersions

The dispersions of this invention can be combined with commercial polymers and polymer dispersions by methods well known to those skilled in the art. Such polymers and dispersions include those described in WIPO Publication WO 02/02657 A2, U.S. Pat. Nos. 4,920,176, 4,292,420, 6,020,438, 6,017,997 and a review article by D. P. Tate and T. W. Bethea, Encyclopedia of Polymer Science and Engineering, Vol. 2, p. 537, the disclosures of which are incorporated herein by reference.

Similarly, the dispersions of this invention can be formed by dispersing the nanoparticle/prepolymer mixture in a previously formed aqueous dispersion of another polymer or polymers and/or nanoparticles. In other words, the aqueous medium into which the nanoparticle/prepolymer mixture is dispersed in accordance with the present invention can itself be a previously formed aqueous dispersion of another polymer or polymers including those made by emulsion and suspension polymerization techniques and/or nanoparticles.

(vi) Hybrids with other Polymers

The aqueous dispersions of this invention can also be used as seed polymers for forming hybrids of polyurethanes with other polymers. This can be done by forming the aqueous dispersions of nanoparticle/polyurethane composite in the manner described above and then polymerizing additional monomers by emulsion or suspension polymerization in the presence of these dispersions, i.e., with the inventive dispersions being mixed with the additional monomers before polymerization is completed. Hybrids of polyurethanes and acrylics can be made to advantage by this approach.

Still another way of making hybrid polymers in accordance with the present invention is to include ethylenically unsaturated monomers in the polyurethane prepolymer reaction system and to cause these monomer to polymerize when or after the prepolymer is dispersed in aqueous medium. In this approach, the ethylenically unsaturated monomers act as a diluent during prepolymer formation. In the aqueous medium, these ethylenically unsaturated monomers can be polymerized to completion with or without additional monomers being added. Hybrids of polyurethanes and acrylics can be made to advantage by this approach, as well.

(vii) Water-Borne Energy Curable Nanoparticle/Polyurethane Compositions

It is already known that water-borne polyurethane and hybrid compositions that can be cured by application of energy (UV and IR radiation and/or electron beams) can be made by end-capping the polyurethane with (meth)acrylic esters and other ethylenically unsaturated monomers. This technology can be applied to this invention to provide energy-curable water-borne nanoparticle/polyurethane coatings.

Applications

The aqueous nanoparticle/polyester-polyurethane dispersions of this invention, both in prepolymer and chain extended form, can be used to make coatings and films for porous and non-porous substrates such as papers, non-woven materials, textiles, leather, wood, concrete, masonry, metals, house wrap and other building materials, fiberglass, polymeric articles, personal protective equipment (such as hazardous material protective apparel, including face masks, medical drapes and gowns, and firemen's turnout gear), and the like. Applications include papers and non-wovens, fibrous materials, films, sheets, composites, and other articles, inks and printing binders, flock and other adhesives, and personal care products such as skin care, hair care, and nail care products, livestock and seed applications, and the like.

Any fibrous material can be coated, impregnated or otherwise treated with the compositions of this invention by methods well known to those skilled in the art, including carpets as well as textiles used in clothing, upholstery, tents, awnings, air bags, and the like. Suitable textiles include fabrics, yarns, and blends, whether woven, non-woven, or knitted, and whether natural, synthetic, or regenerated. Examples of suitable textiles include cellulose acetate, acrylics, wool, cotton, jute, linen, polyesters, polyamides, regenerated cellulose (Rayon), and the like.

Compositions of this invention can also be used to produce articles made of stand-alone films and objects such as personal protective equipment. Examples of protective items include gloves and condoms.

In addition, the compositions of this invention can be used as adhesives or to augment or supplement adhesive types well known to those skilled in the art. For example, particular adhesive properties can be achieved by varying type and amount of isocyanates, type, amount, and molecular weight of polyols, and the amount of poly(alkylene oxide) side chain units.

The polyester-polyurethane nanoparticle composites produced when the aqueous dispersions of this invention are applied and dried, whether or not the polyester-polyurethane is chain extended, exhibit exceptional resistance to degradation by hydrolysis, in particular a resistance to hydrolysis comparable to that of the much more expensive polycarbonate polyurethane resins. Moreover, so long as the $D_{90}$ particle size of the substantially dispersed nanoparticles used is $\leq 75$ nm, preferably $\leq 50$ nm or even $\leq 40$ nm, the polyurethanes obtained will be essentially transparent, provided of course that they are free or essentially free of other materials which would compromise their transparency properties.

Finally, the principles of the present invention can be applied to other technologies for manufacturing aqueous polyurethane dispersions. For example, this invention can be applied to the technique for manufacturing breathable polyurethane dispersions (i.e. dispersions which form layers of breathable polyurethanes) described in U.S. Pat. No. 6,897,281, as well as to the technique for manufacturing core-shell polyurethane dispersions described in U.S. Published Patent Application No. 20050004306. The disclosures of the above patent and published applications are incorporated herein by reference.

WORKING EXAMPLES

In order to more thoroughly describe this invention, the following working examples are provided. In these examples, the following reagents were used:

Bromophenol blue indicator from Aldrich

Carbosperse™ K-7058N—ammonia neutralized solution of poly(acrylic acid) from The Lubrizol Corporation. Solids content ~46%; pH ~7.

DBA—dibutylamine from Aqua Solutions

DeCAL 2042—40% wt. sodium salt of an acrylic copolymer in water from Devine Chemicals, Ltd.

Dehydran 1293—defoamer from Cognis

DMAMP 80—2-dimethylamino-2-methyl-1-propanol, 80% in water from TCI America

DMPA—dimethylolpropanoic acid from GEO Specialty Chemicals

Dowanol DPM from Dow

H12MDI—1,1'-methylenebis-(4-isocyanato cyclohexane); Desmodur® W from Bayer Corporation EDA—ethylene diamine from Alfa Aesar FASCAT® 2003—mixture of 2-ethylhexanoic acid and stannous octoate; catalyst from Elf Atochem North America HCl—1M hydrochloric acid from WVR Humectant GRB 2—from Lubrizol; contains glycerin, nonionic surfactant and polyethylene glycol (PEG).

Hydrazine solution—35 wt. % solution in water from Acros

IMERYS RLO 7428—Calcium carbonate from Imerys

Multiflex-MM®—precipitated calcium carbonate from Specialty Minerals with reported 19 $m^2$/g surface area.

NEP—1-ethyl-2-pyrrolidone from BASF

NMP—1-methyl-2-pyrrolidone from BASF

Placcel® CD210—polycarbonate polyol (number-average molecular weight $M_n$~1,000 g/mol) from Daicel Sancure® 777—polyurethane dispersion from The Lubrizol Corporation.

Sancure® 825—polyurethane dispersion from The Lubrizol Corporation.

Snowflake White®—Limestone (Calcium carbonate) from ECC International with measured 2.0 $m^2$/g BET specific surface area.

Solsperse® 46000—dispersant from Lubrizol, 50% in water

Stabaxol P200—polycarbodiimide antihydrolysis additive for urethane rubbers from LANXESS AG TEA—triethylamine from J. T. Baker TMP—trimethylolpropane from Celanese Toluene from VWR Ultrapaque® Slurry—precipitated calcium carbonate aqueous slurry (40% wt.) from Specialty Minerals with reported 7.5 $m^2$/g surface area.

XC-6600-34—Limestone (Calcium carbonate) aqueous slurry (52% wt.) from Omya Inc. with measured 40.8 $m^2$/g BET specific surface area and particles size 100 nm (D50) and 300 nm (D98).

In addition, the following analytical and testing procedures were used in carrying out these examples:

Brookfield Viscosity. Brookfield viscosity testing was performed using a Brookfield RV viscometer and spindles #3 to #6 (depending on viscosity) at 20 rpm and about 77° F.

Particle Size Measurements. The particle size and size distribution of the dispersions were obtained by the following instruments: Submicron Particle Sizer Autodi- lutePAT Model 370 (NICOMP Particle Sizing Systems) using an intensity averaging with Gaussian distribution; Malvern Zetasizer Nano-S90 with data analysis by Zetasizer Software 6.12 and NanoTrak® particle size analyzer. Solids Content. Total solids were measured by Moisture/Solids Analyzer LabWare 9000™ (CEM Corporation).

Solids Content. Total solids were measured by Moisture/Solids Analyzer LabWare 9000™ (CEM Corporation).

pH Measurements. pH readings were taken using Acumet Basic pH Meter (Fisher Scientific).

Optical Microscopy. The samples were examined using incident (reflected) light on the Leica MZ16 stereomicroscope. The 1.25× objective was used.

Isocyanate (NCO) Titration. A sample of prepolymer (.about.3 grams) is weighted in a 250-ml Erlenmeyer flask. Toluene (50 ml) and 2M dibutylamine solution in toluene (20 ml) are added and the mixture is heated on a hot plate until the prepolymer completely dissolves. The flask is filled up to 200 ml with isopropanol. Bromophenol blue indicator (6-7 drops) is added and solution is titrated with 1N HCl solution until the color changes from blue to light yellow.

Hydrolytic Stability Testing. Samples are drawn on a level 6-mil PET (Mylar®) film to produce a dry film to about 2-3 mils dry. Films are dried overnight at ambient temperature and then cured the next day at 300° F./3 min. Films are cut in one inch strips and placed in the humidity chamber at 75° C./95% relative humidity (RH). The samples are removed from the chamber after a defined period of time and placed in constant temperature humidity room over night prior to testing.

Physical properties. ASTM D882 "Standard Test Method for Tensile Properties of Thin Plastic Sheeting" was adopted for this test. Samples were tested for ultimate tensile and elongation on Instron® Model 4301 retrofitted and equipped with MTS ReNew Elite Controller run by TestWorks 4 software. The gap for the jaws was set to 1 inch, and test was performed at a rate of 2 inches per minute. The peak load and strain at break were recorded for each sample. Three to six measurements were performed for each sample and average result were reported.

Transition Electron Microscopy (TEM) images were obtained with the Philips CM12 Transmission Electron Microscope. A sample is air-dried for two days and microtomed with a diamond blade under cryogenic condition at −160° C. Resulting tiny fragments are transferred onto a copper grid by a one-hair artist brush and the images are recorded.

Haze. The preferred evaluation of haze is visual because perceived haze and clarity are one of the most important properties of coatings and other articles. Haze can also be measured by objective instrumental means. Examples include the method described in ASTM D 1003-07 "Standard Test Method for Haze and Luminous Transmittance of Transparent Plastics", measurement of gloss at different angles, measurement of L,a,b values, and also other methods described in ASTM Guide E179-96(2003) "Standard Guide for Selection of Geometric Conditions for Measurement of Reflection and Transmission Properties of Materials", D1455 "Test Method for 60-deg Specular Gloss of Emulsion Floor Polish", D1746 "Test Method for Transparency of Plastic Sheeting", D4039 "Test Method for Reflection Haze of High-Gloss Surfaces", D4061 "Test Method for Retroreflectance of Horizontal Coatings" and D523 "Test Method for Specular Gloss". The clarity of composite films was evaluated by measuring the haze according to ASTM D 1003-07 "Standard Test Method for Haze and Luminous Transmittance of Transparent Plastics", Procedure B (Section 8). Color i7 Benchtop Spectrophotometer from X-Rite, Inc (former Gretagmacbeth) was used. Sample preparation: Nanodispersion was mixed into Sancure® 777 or Sancure® 825 at 5 parts per 100 polymer parts on dry basis, and a 3-mil-thick (~76 microns) liquid coating with ~35% solids content was applied to Mylar sheet on a level surface; after air-drying for ~30 minutes, the films were cured in an oven for 3 minutes at 300° F. An average of 3 to 9 readings taken at different spots was reported as percent of transmitted light that was scattered.

BET (Brunauer, Emmett and Teller) specific surface area was measured by Micromeritics Analytical Services according to ISO 9277:1995 "Determination of the specific surface area of solids by gas adsorption using the BET method".

Example 1

Preparation of Proton Scavenger Calcium Carbonate Nanoparticle Dispersion

An aqueous dispersion of substantially dispersed calcium carbonate nanoparticles was produced by exfoliation from the following ingredients:

TABLE 1

| Ingredients Used in Example 1 | |
| --- | --- |
| Ingredient | Wt., g |
| IMERYS RLO 7428 (Calcium Carbonate) | 205 |
| Solsperse 46000 (50% Active) | 188 |
| Humectant GRB 2 | 7.6 |
| DMAMP 80 (80% Active) | 0.63 |
| DM Water | 512 |
| TOTAL | 913.7 |

These ingredients were first pre-mixed in separate container and then grinded for approximately 12 hours in a Netzsch Lab Star mill equipped with MicroCer® head, a rotary peristaltic pump and a 0.025-mm screen using a recirculation mode. The chamber was made of silicon nitride and the rotor was made of yttrium oxide-stabilized zirconium oxide. $ZrO_2$—$Y_2O_3$ grinding media with 0.05-mm diameter was used. The following conditions were used: Grinding chamber filling degree between 50 and 60%, pump speed from 14 to 30 lts/min, tip speed from 14 to 18 m/s. An aqueous dispersion containing ~23 wt. % substantially dispersed calcium carbonate nanoparticles was produced. The particle size of these nanoparticles was determined to be $D_{50}$=88 nm and $D_{90}$=180 nm as measured by NanoTrak® particle size analyzer.

Example 2

Hard Polyester-Polyurethane with Nano $CaCO_3$

Prepolymer Step

A hydroxyl terminated polyester polyol having a molecular weight of 500 to 1000 was formed by reacting alkane diols with an aliphatic dicarboxylic acid. This polyester polyol, a small amount of TMP, and a 1.7-2.0 equivalent excess of H12MDI were reacted at 210-240° F. (99-116° C.) under a blanket of dry nitrogen for about an hour. The reaction mixture was cooled to 205° F. (96° C.), and 31 grams DMPA, 150 to 200 grams NEP and a small amount of a catalyst were added to about 600 grams of this system. The reaction mixture was stirred at 205-210° F. (96-99° C.) for an hour to produce an NCO-terminated prepolymer. The mixture was cooled to 150° F. (66° C.), and 26 grams TEA was added with vigorous agitation. Viscosity of the prepolymer was measured at 1,900 cP at about 150° F. (66° C.).

Dispersion Step

A portion (300 grams) of the prepolymer was charged with mixing into 310 g water at 68° F. (20° C.) which contained nano-$CaCO_3$ dispersion from Example 1 (52 grams), a small amount of defoaming agent and coalescing agent Dowanol DPM (34 grams), over the course of about 10-15 minutes to form an aqueous dispersion of composite particles composed of nanoparticles and an NCO-terminated polyurethane prepolymer.

Chain Extension

After about 30 minutes of rigorous agitation, a mixture of hydrazine (7.7 grams), EDA (3.5 grams) and DM water (3.5 grams) was added drop-wise to chain extend the polyurethane prepolymer, thereby producing an aqueous dispersion of nano-$CaCO_3$/polyurethane composite particles having a total solids content of 42.4%, a pH of 8.0, and a Brookfield Viscosity of 600 cP. Mean diameter of particle size distribution was 62 nm (measured by NICOMP and reported as intensity-average Gaussian distribution).

TEM Analysis

A portion of the polyurethane dispersion formed above was applied to a 6 mil polyethylene terephthalate (Mylar®) film and allowed to dry overnight at ambient temperature, thereby producing a dry film to about 2-3 mils in dry thickness. TEM photomicrographs of the polyester-polyurethane nano composite film so obtained are reproduced in FIGS. 1A, 1B and 1C. As can be seen from these figures, the individual nanoparticles in this product are loosely arranged in small, essentially linear, "snake-like" aggregates uniformly distributed throughout the polymer mass, these "snake-like" aggregates typically containing $\leq$100, more typically $\leq$50, $\leq$40, $\leq$30, or even $\leq$20, nanoparticles. Note also from FIG. 1C that the individual nanoparticles appear to have an average or mean particle size about one half of the 0.1μ (micron) dimension line in this photomicrograph, thereby indicating a mean particle size on the order of 50 nm.

Comparative Example A

Hard Polyester-Polyurethane with No $CaCO_3$

Example 2 was repeated except that no nanoparticles were added. The dispersion had a total solids content of 35.7%, a pH of 8.5, a Brookfield Viscosity of 50 cP, and a mean particle size diameter 50 nm (measured by NICOMP and reported as intensity-average Gaussian distribution).

Comparative Example B

Hard Polycarbonate-Polyurethane with No $CaCO_3$

Polycarbonate polyurethanes are known for their outstanding hydrolytic stability but are very expensive to manufacture. Therefore, Comparative Example B was carried out to compare the inventive polyester-polyurethane nanocomposites with these more expensive polycarbonate-polyurethane polymers.

Prepolymer Step

A polycarbonate polyol Placcel CD210 (OH #112.3, 203 grams), 35 grams DMPA, 120 grams NMP and a small amount of a catalyst were reacted with H12MDI (243 grams) at 200-210° F. (93-99° C.) with stirring under a blanket of dry nitrogen for about 2 hours. NCO content was measured at 6.48%. The mixture was cooled to 140° F. (60° C.). Viscosity of the prepolymer was measured at 23,000 cP at this temperature.

Dispersion Step

Prepolymer (470 grams) was charged with mixing into 560 g water which contained 22 grams of TEA at 50° F. (10° C.), over the course of about 10 minutes to form an aqueous dispersion.

Extension Step

After about 20 minutes of rigorous agitation, hydrazine (25 grams) was added drop-wise to chain extend the polyurethane prepolymer, thereby producing an aqueous dispersion of polyurethane having a total solids content of 38.9%, a pH of 7.9, a Brookfield Viscosity of 320 cP, and a mean particle size diameter 50 nm (measured by NICOMP and reported as intensity-average Gaussian distribution).

Hydrolysis Testing

Another portion of the dried polyester-polyurethane nanocomposite film produced in Example 2 above (after drying overnight) was cured the next day by heating at 300° F. (149° C.) for 3 minutes. The film was cut into one inch strips which were then subjected to a standard hydrolysis resistance test as described above. For comparative purposes, the same hydrolysis resistance test was carried out on cured test strips made from the polyester polyurethane of Comparative Example A in which the calcium carbonate proton scavenger nanoparticles were omitted. In addition, the same hydrolysis resistance test was also carried out on test strips made from polycarbonate-polyurethane of Comparative Example B, these test strips also having been cured in the same way as those of Example 2 and Comparative Example A. The following results were obtained:

TABLE 2

Hydrolytic Stability of Hard PUDs

| | Tensile, psi | | | Elongation, % | | |
|---|---|---|---|---|---|---|
| Days of Exposure | Comp Ex A Polyester PUD | Ex 2 Polyester PUD-nano CaCO3 | Comp Ex B Polycarbonate PUD | Comp Ex A Polyester PUD | Ex 2 Polyester PUD-nano CaCO3 | Comp Ex B Polycarbonate PUD |
| 0 | 8270 | | 5000 | 330 | | 308 |
| 2 | 6600 | 8230 | 8800 | 261 | 338 | 360 |
| 4 | 7480 | 8600 | 7770 | 232 | 315 | 302 |
| 7 | 2770 | 8350 | 7100 | 2 | 319 | 284 |
| 14 | 0 | 7180 | | 0 | 245 | |
| 28 | 0 | 6400 | 6300 | 0 | 160 | 195 |

A value of 0 in Table 2 was assigned to films which could not be lifted off of the Mylar substrate without disintegration.

As can be seen from Table 2, the nano-CaCO$_3$ stabilized polyester polyurethane of this invention (Example 2) exhibited a hydrolysis resistance which was not only far better than that of the unstabilized identical polyester polyurethane but also essentially as good as that exhibited by its polycarbonate polyurethane counterpart. This demonstrates that addition of proton scavenger nanoparticles to a polyester polyurethane will substantially eliminate the susceptibility of the polymer to degrade by hydrolysis, provided that the proton scavenger nanoparticles are in a substantially dispersed form. This, in turn, indicates that it is now possible to provide the performance previously achievable only by the far more expensive polycarbonate polyurethanes with the far less expensive polyester polyurethanes of this invention.

Example 3

Soft Polyester-Polyurethane with 5% wt. Nano CaCO$_3$

Prepolymer Step

A hydroxyl terminated polyester polyol having a number-average molecular weight of 2000 to 3000 was formed by reacting an alkane diol, an aliphatic dicarboxylic acid and an aromatic dicarboxylic acid. This polyester polyol, a small amount of a trifunctional low molecular weight polyol, a small amount of a catalyst and an excess of H12MDI were reacted at 200-220° F. (93-104° C.) under a blanket of dry nitrogen for about 30 minutes. The reaction mixture was cooled to 195° F. (91° C.), and 21 grams DMPA, ~200 grams NMP and a small amount of a catalyst were added to about 560 grams of this system. The reaction mixture was stirred at 205-210° F. (96-99° C.) for an hour to produce an NCO-terminated prepolymer. The mixture was cooled to 130° F. (54° C.), and 17 grams TEA was added with vigorous agitation. Viscosity of the prepolymer was measured at 6,900 cP at about 125° F. (52° C.).

Combining the Proton Scavenger Calcium Carbonate Nanoparticles

About 20 minutes after TEA addition, a portion (300 grams) of the prepolymer was charged with mixing into 200 g water which contained 49 grams of nano-CaCO$_3$ dispersion from Example 1 at 60° F. (16° C.), over the course of about 5 minutes to form an aqueous dispersion of composite particles composed of nanoparticles and an NCO-terminated polyurethane prepolymer.

Extension Step

After about 30 minutes of rigorous agitation, hydrazine (5.7 grams) was added drop-wise to chain extend the polyurethane prepolymer, thereby producing an aqueous dispersion of nano-CaCO$_3$/polyurethane composite particles having a total solids content of 43.3%, a pH of 7.9, and a Brookfield Viscosity of 20 cP. Mean diameter of particle size distribution was 132 nm (measured by NICOMP and reported as intensity-average Gaussian distribution).

Comparative Example C

Soft Polyester-Polyurethane with No Nano CaCO$_3$

Example 3 was repeated except the nanoparticles were omitted. The dispersion had a total solids content of 38.5%, a pH of 7.6, and a Brookfield Viscosity of 10 cP. Mean diameter of particle size distribution was 112 nm (measured by NICOMP and reported as intensity-average Gaussian distribution).

Comparative Example D

Soft Polyester-Polyurethane with Conventional Hydrolysis Stabilizer

Stabaxol P200 (2 grams), a well-known commercially-available carbodiimide hydrolysis stabilizer, was added to 100 g of the aqueous polymer dispersion produced in Comparative Example C with mixing.

Hydrolysis Stability

One inch test strip of the polymer products produced in the above Example 3 and Comparative Examples C and D, after curing in the manner described above, were subjected to the same hydrolytic stability testing protocol described above. The following results were obtained:

TABLE 3

Hydrolytic Stability of Soft PUDs

| Days of Exposure | Tensile, psi | | | Elongation, % | | |
|---|---|---|---|---|---|---|
| | Comp Ex C Polyester PUD | Ex 3 Polyester PUD + nano CaCO3 | Comp Ex D Polyester PUD + Carbodiimide | Comp Ex C Polyester PUD | Ex 3 Polyester PUD + nano CaCO3 | Comp Ex D Polyester PUD + Carbodiimide |
| 0 | 2360 | 2300 | 2470 | 810 | 820 | 900 |
| 2 | 242 | 2010 | 620 | 770 | 640 | 790 |
| 4 | 0 | 3050 | 0 | 0 | 790 | 0 |
| 7 | | 2360 | | | 760 | |
| 14 | | 1291 | | | 700 | |
| 28 | | 553 | | | 290 | |

Table 3 shows that the inventive polyester-polyurethane nanoparticle composite of Example 3 exhibited a tensile strength and elongation after hydrolysis testing that far exceed those of the unmodified polyester-polyurethane of Comparative Example C and the conventionally-stabilized polyester-polyurethane of Comparative Example D.

Example 4

Blends of the Inventive Polyester-Polyurethane Nanocomposite

The polyester-polyurethane nanocomposite aqueous dispersion of Example 4 was blended with different amounts of the unmodified polyester-polyurethane aqueous dispersion of Comparative Example A to produce polymer products containing 0.5 wt. %, 1.0 wt. % and 2.5 wt. % CaCO3 nanoparticles on a dry weight basis, i.e., in the final dry product. The polymer blends so obtained, after forming into dried and cured polymer film test strips in the same manner as described above, were subjected to the same hydrolysis testing as described above. The results obtained are set forth in the following Table 4.

persions of these polymers. Other approaches for making these blends can also be used. For example, different polymers, i.e., polymers which are different from the polyester-polyurethane of the composite, can be blended with the composite. Alternatively, different polymers can be made into nano composite as for example is taught in US 2008/0153975 A1, the entire disclosure of which is incorporated herein by reference, and then blended with polyester-polyurethane. In addition, different blending procedures can also be used, for example, melt blending, solvent blending, dry blending and the like.

Example 5

Hard Polyester-Polyurethane with 5% $CaCO_3$ from Omya

The unmodified polyester-polyurethane aqueous dispersion of Comparative Example A was mixed with XC-6600-34—calcium carbonate dispersion from Omya—to produce polymer composite containing 5 wt. % $CaCO_3$ on a dry weight basis, i.e., in the final dry product. The polymer nano composite so obtained was subjected to the same hydrolysis

TABLE 4

Hydrolytic Stability of Hard PUD Nano Composites

| Days of Exposure | Tensile, psi | | | Elongation, % | | |
|---|---|---|---|---|---|---|
| | Ex 4A Polyester PUD + 0.5% nano CaCO3 | Ex 4B Polyester PUD + 1.0% nano CaCO3 | Ex 4C Polyester PUD + 2.5% nano CaCO3 | Ex 4A Polyester PUD + 0.5% nano CaCO3 | Ex 4B Polyester PUD + 1.0% nano CaCO3 | Ex 4C Polyester PUD + 2.5% nano CaCO3 |
| 0 | 8050 | 8360 | 7140 | 275 | 320 | 240 |
| 2 | 7150 | 7870 | 8110 | 265 | 285 | 330 |
| 4 | 8780 | 8190 | 8760 | 225 | 270 | 305 |
| 7 | 2540 | 4120 | 7870 | 3 | 4 | 220 |

Table 4 shows that addition of even very small amounts of nano $CaCO_3$ will yield significant improvement in the hydrolytic stability of polyester polyurethanes. More specifically, Table 4 shows that still another way of incorporating a desired concentration of proton scavenger nanoparticles into a polyester-polyurethane is to form a polyester-polyurethane nanoparticle composite in the manner described above having a relatively higher concentration of proton scavenger nanoparticles and then to blend this composite with another polymer to achieve a product polymer composite having a desired, relatively lower concentration of these nanoparticles. In this example, the same polyester-polyurethane as in the polyester-polyurethane nanoparticle composite was blended with the composite, and blending was done by mixing aqueous distesting as described above. The test films were hazy as made and remained hazy throughout the duration of the test. The results obtained are set forth in the following Table 5.

TABLE 5

Hydrolytic Stability of Hard PUD with 5% Omya

| Days of Exposure | Tensile, psi | Elongation, % |
|---|---|---|
| 0 | 8200 | 230 |
| 2 | 7900 | 200 |
| 4 | 8300 | 170 |
| 7 | 7900 | 270 |

TABLE 5-continued

Hydrolytic Stability of Hard PUD with 5% Omya

| Days of Exposure | Tensile, psi | Elongation, % |
|---|---|---|
| 14 | 9200 | 210 |
| 28 | 7900 | 20 |

Example 6

Effect of Specific Surface Area of Calcium Carbonate on Hydrolytic Stability of Soft Polyester-Polyurethane The unmodified polyester-polyurethane aqueous dispersion of Comparative Example C was mixed with calcium carbonates with different specific surface areas to produce polymer composites containing 5 wt. % $CaCO_3$ on a dry weight basis. The $CaCO_3$-polymer composites so obtained were subjected to the hydrolysis testing as described above. The test films were hazy as made and remained hazy throughout the duration of the test. The results obtained are set forth in the following Table 6. A surprising step-change increase in performance is observed for calcium carbonate XC-6600-34 with high specific surface area (Example 6D).

TABLE 6

Effect of Specific Surface Area of Calcium Carbonate on Hydrolytic Stability of Soft Polyester-Polyurethane.

| Example | CaCO3 source | Surface area m²/g | Ultimate tensile psi | Elongation at break % |
|---|---|---|---|---|
| Ex 6A | Snowflake White | 2.0 | 269 | 210 |
| Ex 6B | Ultrapaque | 7.5 | 352 | 299 |
| Ex 6C | Multiflex-MM | 19 | 350 | 285 |
| Ex 6D | XC-6600-34 | 40.8 | 946 | 524 |

Example 7

Preparation of Calcium Carbonate Nanoparticle Dispersion

Omya XC-6600-34 calcium carbonate was further refined by nanomilling. The following ingredients were used:

| Ingredient | Wt., g |
|---|---|
| Omya XC-6600-34 | 256 |
| Solsperse 46000 | 124 |
| Carbosperse K-7058N | 14.7 |
| Humectant GRB 2 | 5 |
| DMAMP 80 | 0.35 |
| Water | 400 |
| TOTAL | 800 |

The ingredients were mixed in a container using Cowles blade at ~800 rpm for about 15 minutes to produce uniform dispersion. Then the mixture was transferred through a 75-micron filter into the jacketed cooling tank connected to Netzsch LabStar mill equipped with MicroCer® head, a rotary peristaltic pump and a 0.025-mm screen. The chamber was made of silicon nitride and the ø6.9-cm rotor was made of polyurethane. Yttrium oxide-stabilized zirconium oxide ($ZrO_2$—$Y_2O_3$) grinding media (YTZ beads) with 0.1-mm diameter was used. Grinding chamber was filled up to 80% vol. with YTZ beads.

In order to deaerate the lines and milling chamber and to avoid foaming, the mill was run at 1,000 rpm and pump speed 75 ml/min for the first 5 minutes. When the system was free of air, the rotor speed was increased to 3,600 rpm (tip speed ~13 m/s) and the pump was set to 125 ml/min. Grinding was conducted in the re-circulation mode for 20 minutes at 25 to 35° C.

An aqueous dispersion containing ~17% wt. substantially dispersed calcium carbonate nanoparticles was produced. The Z-average particle size was 190 nm with $D_{50}$=212 nm and $D_{90}$=370 nm as measured by Malvern particle size analyzer. The haze of the 5% wt CaCO3 composite film with SC 777 was measured at 2.8% and the haze was barely noticeable to the eye. In comparison, the virgin Omya XC-6600-34 calcium carbonate produced 5% wt CaCO3 composite film with SC 777 with the very visible to the eye haze and the value of 7.5%. The haze of the polyurethane film without calcium carbonate was measured at 0.86%.

Example 8

Composite with Calcium Carbonate from Example 7

Calcium carbonate dispersion from Example 7 was added to PUD from Comparative Example C at the level of 5% wt. of dry CaCO3 per dry polymer.

The composite was subjected to the same hydrolytic stability testing protocol described above. The following results were obtained:

TABLE 7

Hydrolytic Stability of Soft PUDs

| Days of Exposure | Tensile psi | Elongation % |
|---|---|---|
| 4 | 1430 | 560 |
| 7 | 1500 | 610 |
| 14 | 1670 | 670 |

Table 7 shows that the inventive polyester-polyurethane nanoparticle composite of Example 8 exhibited a tensile strength and elongation after hydrolysis testing that far exceed those of the unmodified polyester-polyurethane of Comparative Example C and the conventionally-stabilized polyester-polyurethane of Comparative Example D (see Table 3).

Example 9

Preparation of Calcium Carbonate Nanoparticle Dispersion

The refining of Omya XC-6600-34 was conducted in a manner similar to Example 7 with the following differences. The following ingredients were used in the initial charge:

| Ingredient | Wt., g |
|---|---|
| Omya XC-6600-34 | 182 |
| Solsperse 46000 | 94 |
| Carbosperse K-7058N | 6 |
| Humectant GRB 2 | 4 |

| Ingredient | Wt., g |
|---|---|
| DMAMP 80 | 0.25 |
| Water | 335 |
| TOTAL | 621 |

Milling was conducted for ~3 hours. At 2 hours into milling, the pump speed was decreased to 100 ml/min. Mixtures of 6 grams Carbosperse K-7058N with 6 grams water were added at 10, 30, 80 and 150 minutes. Additional 6 grams Solsperse 46000 were added at 100 minutes.

An aqueous dispersion containing ~14% wt. substantially dispersed calcium carbonate nanoparticles was produced. The Z-average particle size was 100 nm with $D_{50}=117$ nm and $D_{90}=241$ nm as measured by Malvern particle size analyzer. The 5% wt CaCO3 composite film with SC 777 was practically clear and the haze was measured at 0.88%. For comparison, the haze of the polyurethane film without calcium carbonate was measured at 0.86%.

Example 10

Preparation of Calcium Carbonate Nanoparticle Dispersion

The refining of Omya XC-6600-34 was conducted in a manner similar to Example 7 with the following differences. The following ingredients were used in the initial charge:

| Ingredient | Wt., g |
|---|---|
| Omya XC-6600-34 | 193 |
| Solsperse 46000 | 93 |
| Humectant GRB 2 | 4 |
| DMAMP 80 | 0.25 |
| Water | 292 |
| TOTAL | 583 |

Milling was conducted for ~1 hour 40 minutes at pump speed 90 ml/min. In the first 40 minutes, the rotor speed was gradually increased from 2,000 to 3,600 rpm. At 1 hour, 7 grams DeCAL 2042 and 10 grams DM water were added. At the end of milling, additional 20 grams DeCAL 2042 and 10 grams water were added.

Figure 3:
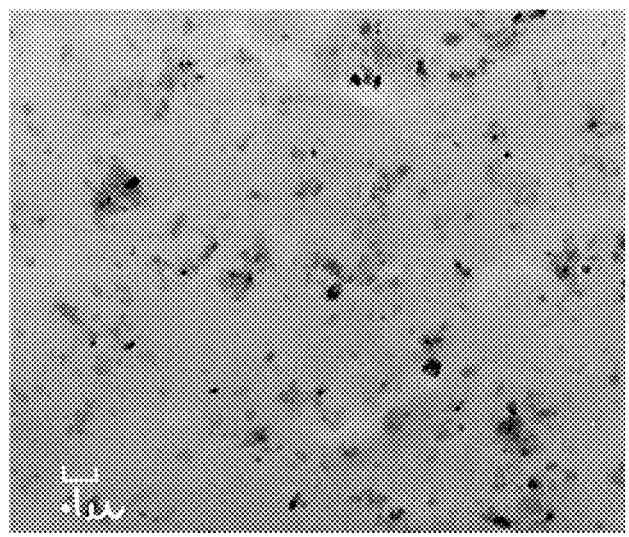
FIG. 3 is a plot of the tensile strength and elongation to break for $CaCO_3$ of various nitrogen BET surface area in $m^2/g$.

An aqueous dispersion containing ~16% wt. substantially dispersed calcium carbonate nanoparticles was produced. The Z-average particle size was 126 nm with $D_{50}=139$ nm and $D_{90}=227$ nm as measured by Malvern particle size analyzer. TEM photo of the 5% wt. nanocomposite with Sancure 825 is shown on FIG. 3.

Although only a few embodiments of this invention have been described above, it should be appreciated that many modifications can be made without departing from the spirit and scope of the invention. All such modifications can be included within the scope of the invention, which is to be limited only by the following claims.

The invention claimed is:

1. A hydrolytically stable polyester polyurethane nanocomposite comprising a solid polyester-polyurethane polymer containing 0.1 to 15 wt. % of proton scavenger nanoparticles based on the weight of the polyester polyurethane nanocomposite, wherein said proton scavenger nanoparticles are characterized by a nitrogen BET surface area of greater than 20 $m^2/g$ in a substantially dispersed form, wherein the proton scavenger comprises a carbonate salt of calcium, magnesium, and/or strontium and wherein the polyester polyurethane polymer is the reaction product of a polyisocyanate, an ester-containing multi-functional isocyanate-reactive compound, and a water-dispersibility enhancing compound.

2. The polyester polyurethane nanocomposite of claim 1, wherein the carbonate salt comprises calcium carbonate and the solid polyester polyurethane polymer is in the form of a coating, film, adhesive, or shaped article.

3. The polyester polyurethane nanocomposite of claim 1, wherein the proton scavenger nanoparticles are formed by comminuting or exfoliation.

4. The polyester polyurethane nanocomposite of claim 1, wherein the particle size of the proton scavenger nanoparticles is small enough so that the solid polyester polyurethane is essentially transparent.

5. The polyester polyurethane nanocomposite of claim 1, wherein the water-dispersibility enhancing compound is of the type that incorporates carboxyl groups into the prepolymer.

6. The polyester polyurethane nanocomposite of claim 5, wherein the ester-containing multi-functional isocyanate-reactive compound is a polyol.

7. The polyester polyurethane nanocomposite of claim 5, wherein the polyester polyurethane is chain extended.

8. An aqueous dispersion of a hydrolytically stable polyester polyurethane nanocomposite, the aqueous dispersion comprising water, a polyester polyurethane and 0.1 to 15 wt. % of substantially dispersed proton scavenger nanoparticles characterized by a nitrogen BET surface area of greater than 20 $m^2/g$, wherein the proton scavenger comprises a calcium, magnesium, and/or strontium carbonate salt and wherein said wt.% is based on the weight of hydrolytically stable polyester polyurethane nanocomposite exclusive of water and solvent media and the polyester polyurethane is the reaction product of a polyisocyanate, an ester-containing multi-functional isocyanate-reactive compound, and a water-dispersibility enhancing compound.

9. The aqueous dispersion of claim 8, wherein the proton scavenger nanoparticles are formed by exfoliation and/or milling.

10. The aqueous dispersion of claim 8, wherein the particle size of the proton scavenger nanoparticles is small enough so that the polyester polyurethane is essentially transparent to visible light after said aqueous dispersion is dried.

11. The aqueous dispersion of claim 8, wherein the water-dispersibility enhancing compound is of the type that incorporates carboxyl groups into the prepolymer.

12. The aqueous dispersion of claim 11, wherein the ester-containing multi-functional isocyanate-reactive compound is a polyol.

13. The aqueous dispersion of claim 8, wherein the polyester polyurethane is a prepolymer.

14. The aqueous dispersion of claim 8, wherein the polyester polyurethane is chain extended.

15. A process for making the aqueous dispersion of claim 8 in which calcium, magnesium, and/or strontium carbonate proton scavenger nanoparticles already in a substantially dispersed form are combined with at least one of (a) the prepolymer used to form the polyester-polyurethane polymer before this prepolymer is combined with water for forming an aqueous dispersion, (b) this prepolymer after it is combined with water forming an aqueous prepolymer dispersion, (c) one or more ingredients forming this prepolymer, (d) an aqueous dispersion of the polyester-polyurethane polymer formed by chain extending this prepolymer, (e) the polyester-polyurethane as it is dispersed in water and (f) combinations thereof forming a polyester polyurethane nanocomposite where the calcium, magnesium, and/or strontium carbonate is present at 0.1 to 15 wt. % based on the polyester polyurethane nanocomposite less water and solvent media.

16. A process for making an aqueous dispersion comprising water, a polyester polyurethane in dispersed form and substantially dispersed proton scavenger nanoparticles characterized by a nitrogen BET surface area of greater than 20 $m^2/g$, wherein the proton scavenger comprises a carbonate salt and wherein the polyester polyurethane is the reaction product of a polyisocyanate, an ester-containing multi-functional isocyanate-reactive compound, and a water-dispersibility enhancing compound in which a preliminary material comprising the proton scavenger in the form of particles and/or agglomerates having a larger particle size than said nanoparticles is comminuted in the presence of at least one of (a) the prepolymer used to form the polyester-polyurethane polymer before this prepolymer is combined with water for forming an aqueous dispersion, (b) this prepolymer after it is combined with water for forming an aqueous prepolymer dispersion, (c) one or more ingredients forming this prepolymer or polyurethane nanocomposite, and (d) combinations thereof.

17. The polyester polyurethane nanocomposite of claim 1, wherein said proton scavenger nanoparticles are characterized by a nitrogen BET surface area of at least 30 $m^2/g$.

18. The polyester polyurethane nanocomposite of claim 1, wherein said proton scavenger nanoparticles are characterized by a primary crystallite size D50 of less than 100 nanometers.

19. The aqueous dispersion of claim 8, wherein said proton scavenger nanoparticles are characterized by a primary crystallite size D50 of less than 100 nanometers.

20. A hydrolytically stable thermoplastic polyester polyurethane nanocomposite comprising a solid polyester-polyurethane polymer containing 0.1 to 15 wt. % proton scavenger nanoparticles characterized by a nitrogen BET surface area of greater than 20 $m^2/g$ in a substantially dispersed form, wherein the proton scavenger comprises calcium, magnesium, and/or strontium carbonate, and wherein said polyester polyurethane nanocomposite is characterized by the particle size of the proton scavenger nanoparticles being small enough so that the polyester polyurethane nanocomposite is transparent to visible light.

21. A hydrolytically stable polyester polyurethane nanocomposite comprising a solid polyester-polyurethane polymer containing proton scavenger nanoparticles characterized by a nitrogen BET surface area of greater than 20 $m^2/g$ in a substantially dispersed form, wherein the proton scavenger consists of a silicate of Ca and/or Mg.

22. The polyester polyurethane nanocomposite of claim 1, wherein said proton scavenger nanoparticles are characterized by a primary crystallite size D90 of less than 100 nanometers.

* * * * *